(12) United States Patent
Durham et al.

(10) Patent No.: US 11,360,209 B2
(45) Date of Patent: Jun. 14, 2022

(54) MULTIPLE BEAM ANTENNA FOR WIDE SWATH SATELLITE BASED SAR

(71) Applicant: Eagle Technology, LLC, Melbourne, FL (US)

(72) Inventors: Timothy Earl Durham, Melbourne, FL (US); Robert M. Taylor, Rockledge, FL (US); Kerry T. Speed, Melbourne, FL (US); Donald A. Lieb, Melbourne, FL (US)

(73) Assignee: Eagle Technology, LLC, Melbourne, FL (US)

( * ) Notice: Subject to any disclaimer, the term of this patent is extended or adjusted under 35 U.S.C. 154(b) by 601 days.

(21) Appl. No.: 16/402,941

(22) Filed: May 3, 2019

(65) Prior Publication Data

US 2020/0348412 A1   Nov. 5, 2020

(51) Int. Cl.
| | | |
|---|---|---|
| *G01S 13/90* | (2006.01) | |
| *G01S 7/03* | (2006.01) | |
| *G01S 7/282* | (2006.01) | |
| *H01Q 9/04* | (2006.01) | |
| *H01Q 21/28* | (2006.01) | |

(Continued)

(52) U.S. Cl.
CPC .......... *G01S 13/9004* (2019.05); *G01S 7/032* (2013.01); *G01S 7/282* (2013.01); *H01Q 9/0407* (2013.01); *H01Q 9/16* (2013.01); *H01Q 19/10* (2013.01); *H01Q 21/28* (2013.01)

(58) Field of Classification Search
CPC ...... G01S 13/9004; G01S 7/032; G01S 7/282; G01S 13/90; G01S 13/904; G01S 13/9076; H01Q 9/0407; H01Q 9/16; H01Q 19/10; H01Q 21/28; H01Q 1/288; H01Q 21/24; H01Q 25/007
See application file for complete search history.

(56) References Cited

U.S. PATENT DOCUMENTS

| | | |
|---|---|---|
| 4,717,916 A | 1/1988 | Adams et al. |
| 5,394,151 A | 2/1995 | Knaell et al. |

(Continued)

FOREIGN PATENT DOCUMENTS

| | | | | |
|---|---|---|---|---|
| DE | 102013216461 A | | 6/2014 | |
| KR | 20160072358 A | * | 6/2016 | ............. G01S 13/48 |
| KR | 20180073078 A | * | 11/2018 | ............. G01S 7/024 |

OTHER PUBLICATIONS

Feng He, Zhen Dong, and Diannong Liang, "A novel space-time coding Alamouti waveform scheme for MIMO-SAR implementation", IEEE Geoscience and Remote Sensing Letters, vol. 12(2), p. 229-233, Feb. 2015. (Year: 2015).*

(Continued)

*Primary Examiner* — Vladimir Magloire
*Assistant Examiner* — Yonghong Li
(74) *Attorney, Agent, or Firm* — Edell, Shapiro & Finnan, LLC

(57) ABSTRACT

A radar antenna for a flight vehicle that follows a flight path comprises a radio frequency (RF) reflector, and separated first arrays of first RF feed elements to form, with the reflector, respective first fixed radar beams that are directed at the Earth and positionally offset with respect to each other, such that when the radar antenna follows the flight path, the respective first fixed radar beams trace respective first subswaths on the Earth that are separated from each other by respective subswath gaps.

15 Claims, 15 Drawing Sheets

(51) Int. Cl.
*H01Q 9/16* (2006.01)
*H01Q 19/10* (2006.01)

(56) References Cited

U.S. PATENT DOCUMENTS

| | | | |
|---|---|---|---|
| 5,627,543 A | 5/1997 | Moreira | |
| 5,677,693 A | 10/1997 | Frankot et al. | |
| 6,043,779 A * | 3/2000 | Lalezari | H01Q 3/26 342/371 |
| 6,100,839 A | 8/2000 | Heger et al. | |
| 6,781,540 B1 * | 8/2004 | MacKey | G01S 13/90 342/188 |
| 6,965,341 B1 | 11/2005 | Cho et al. | |
| 8,013,778 B2 | 9/2011 | Grafmueller et al. | |
| 8,193,974 B2 | 6/2012 | Logan et al. | |
| 9,134,415 B2 | 9/2015 | Li et al. | |
| 9,329,073 B2 | 5/2016 | Sai | |
| 9,523,768 B1 | 12/2016 | Rincon | |
| 9,684,071 B2 | 6/2017 | Wishart | |
| 9,869,763 B2 | 1/2018 | Calabrese | |
| 9,869,764 B2 | 1/2018 | Calabrese | |
| 9,952,313 B2 | 4/2018 | Cho | |
| 9,958,539 B2 | 5/2018 | Torre | |
| 10,075,231 B2 | 9/2018 | Buer et al. | |
| 2004/0150547 A1 | 8/2004 | Suess et al. | |
| 2006/0170585 A1 | 8/2006 | Stankwitz et al. | |
| 2007/0194977 A1 | 8/2007 | Goutoule et al. | |
| 2010/0052970 A1 | 3/2010 | Moussally et al. | |
| 2015/0378018 A1 | 12/2015 | Calabrese | |
| 2016/0109570 A1 | 4/2016 | Calabrese | |
| 2016/0139261 A1 | 5/2016 | Becker | |
| 2017/0016979 A1 | 1/2017 | Cho | |
| 2018/0284262 A1 | 10/2018 | Mllano et al. | |
| 2018/0335518 A1 * | 11/2018 | Fox | G01S 7/025 |
| 2020/0174117 A1 | 6/2020 | Roemer | |
| 2021/0041556 A1 | 2/2021 | Fox et al. | |

OTHER PUBLICATIONS

Freeman, A., et al., "SweepSAR: Beam-forming on Receive Using a Reflector-Phased Array Feed Combination for Spaceborne SAR," 2009 IEEE Radar Conference, Pasadena, California, pp. 1-9 (May 2009).

Krieger, G., et al., "Advanced Concepts for High-Resolution Wide-Swath SAR Imaging," 8th European Conference on Synthetic Aperture Radar, Aachen, Germany, pp. 524-527 (Jun. 2010).

Krieger, G., et al., "Digital Beamforming and MIMO SAR: Review and New Concepts," Proc. EUSAR, Nuremberg, Germany, pp. 11-14, 2012.

Li, L., and J. Krolik, "Vehicular MIMO SAR Imaging in Multipath Environments," 2011 IEEE National Radar Conference (RADAR), pp. 989-994, May 2011.

Bordoni, F., et al., "Multifrequency Subpulse SAR: Exploiting Chirp Bandwidth fro an Increased Coverage", IEEE Geoscience and Remote Sensing Letters, vol. 16(1): 40-45 (Jan. 2019).

Hay et al., "Applications of Phased Array Feeders in Reflector Antennas", Sprinoer Science+Business Media Sinoapore 2016 ZN Chen et al. (eds.), Handbook of Antenna Technologies, pp. 3139-3187 (2016).

\* cited by examiner

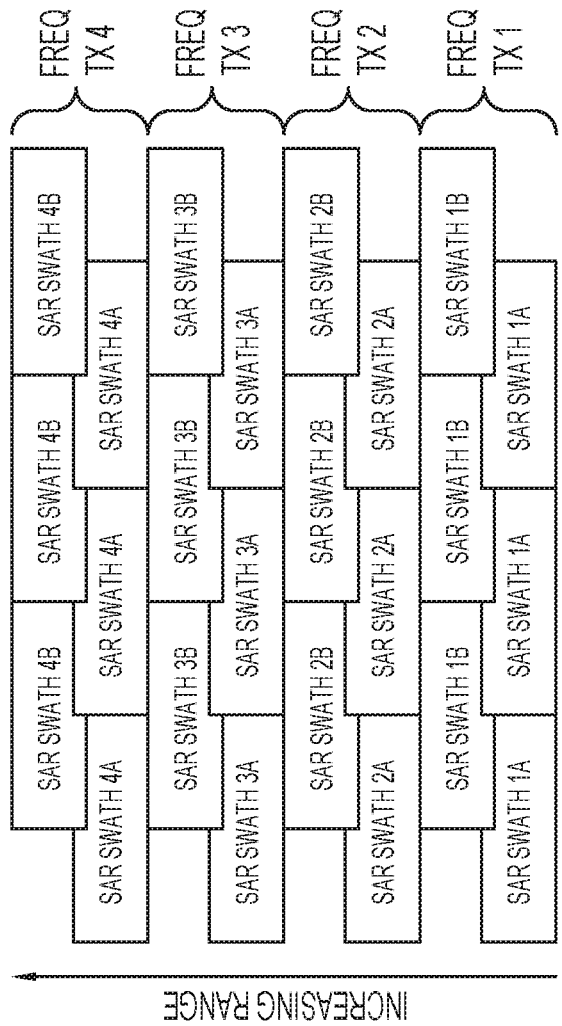
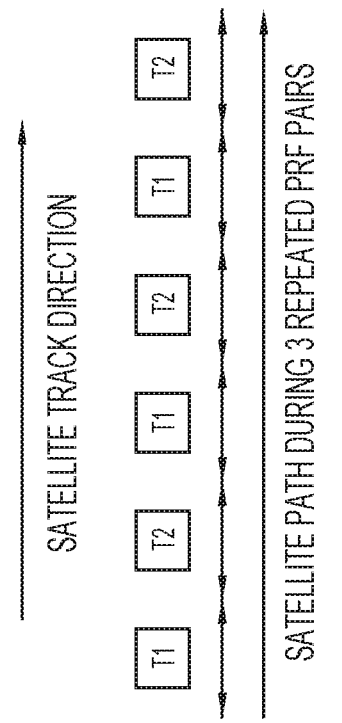
FIG.6

US 11,360,209 B2

MULTIPLE BEAM ANTENNA FOR WIDE SWATH SATELLITE BASED SAR

TECHNICAL FIELD

The present disclosure relates to radar antennas.

BACKGROUND

Synthetic aperture radar (SAR) is highly effective for remote sensing using active microwave transmissions at a variety of wavelengths between L-band and Ku-band, but achieving a large range swath is difficult. In a conventional single feed scan mode radar system, the length of the continuous range swath that can be received is limited by the radar reception time window between consecutive transmitted pulses. The maximum time between transmit pulses required to avoid Doppler ambiguities within the antenna beam width is one half the antenna width divided by the platform velocity. This inherent limit on range swath is a significant issue for smaller antennas, especially when the antenna is not tall enough to form a narrow enough beam to suppress radar returns from ambiguous ranges. Conventionally, phased array antennas are often used to electronically steer their radio frequency (RF) beams on the ground to increase the SAR coverage area. These phased arrays must handle high power and are expensive to manufacture.

BRIEF DESCRIPTION OF THE DRAWINGS

FIG. 2A is a plot of time vs. frequency for an example arrangement of chirped pulses (i.e., "chirps") transmitted by set A and set B antenna feeds during first and second time periods for airborne applications.

FIG. 2B is a plot of time vs. frequency for an example arrangement of chirped pulses (i.e., "chirps") transmitted by set A and set B antenna feeds during first and second time periods for spaceborne applications.

FIG. 6 is a plot of an example of swath coverage in terms of increasing range from the satellite and satellite track direction/time.

DESCRIPTION OF EXAMPLE EMBODIMENTS

Overview

A radar antenna for a flight vehicle that follows a flight path, comprises a radio frequency (RF) reflector. The radar antenna also comprises separated first arrays of first RF feed elements to form, with the reflector, respective first fixed radar beams that are directed at the Earth and positionally offset with respect to each other, such that when the radar antenna follows the flight path, the respective first fixed radar beams trace respective first subswaths on the Earth that are separated from each other by respective subswath gaps.

Example Embodiments

Figure 1A:
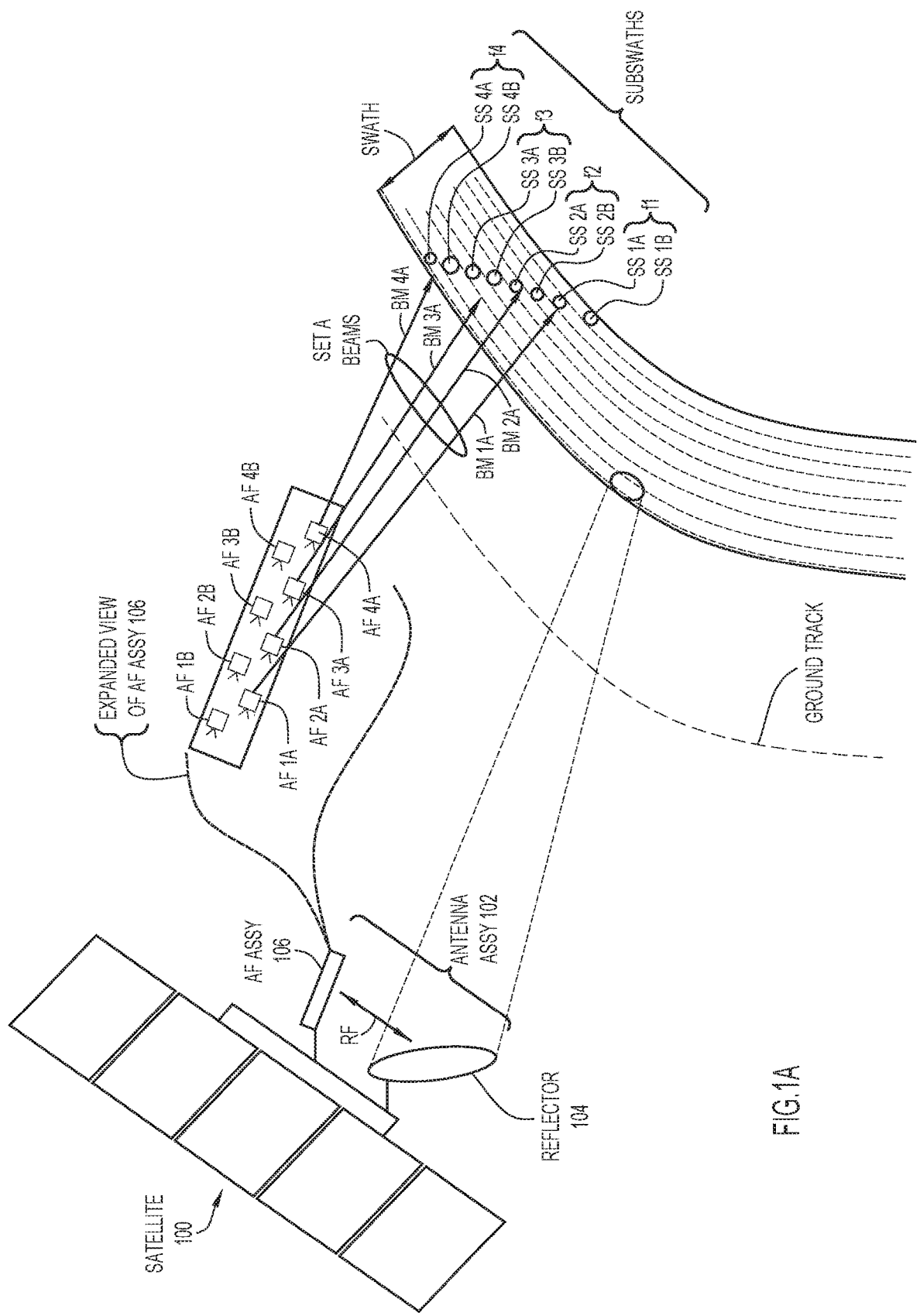
FIG. 1A is an illustration of an example satellite used as a platform for a multi-channel split swath (MCSS) SAR used to illuminate a SAR swath on the Earth's surface.

Embodiments presented herein overcome the above-mentioned problems, disadvantages, and challenges associated with conventional SARs, and offer advantages that will become apparent from the ensuing description. With reference to FIG. 1A, there is an illustration of an example satellite 100 that provides a platform for a multi-channel split swath (MCSS) SAR to illuminate on a surface of the Earth a SAR swath along a ground track as the satellite travels through space in a direction substantially parallel to the ground track. The MCSS SAR platform may be any flight vehicle, including, but not limited to, satellite 100, an airplane, aerostat, drone, and the like.

More specifically, FIG. 1A shows an example antenna assembly 102 of the MCSS SAR used to illuminate/form the swath. Further details of antenna assembly 102 are described below in connection with FIGS. 1B-1E, and further details of the MCSS SAR are described below in connection with FIGS. 7A, 7B, and 8. Antenna assembly 102 includes a parabolic dish reflector 104 (e.g., a 4 meter reflector) and an antenna feed assembly 106 that exchange RF signals with each to form multiple antenna (radar) beams to transmit energy to the swath in the form of frequency-separated trains of concurrent radar pulses, and to receive returns/reflections of the concurrent radar pulses from the swath, as will be described in detail below. The MCSS SAR embodiments presented herein employ radar pulses in the form of frequency chirped pulses (referred to simply as "chirps"). A chirp is a signal, e.g., a carrier wave, having a frequency that increases with time over a duration of the chirp (i.e., an up-chirp) or decreases with time over the duration of the chirp (i.e., a down-chirp). It is understood that other MCSS embodiments may employ radar pulses other than chirps. Such radar pulses may each convey a carrier wave that has a frequency that is either constant, or that varies according to a non-chirp frequency-time function, over a duration of the pulse.

Figure 3:
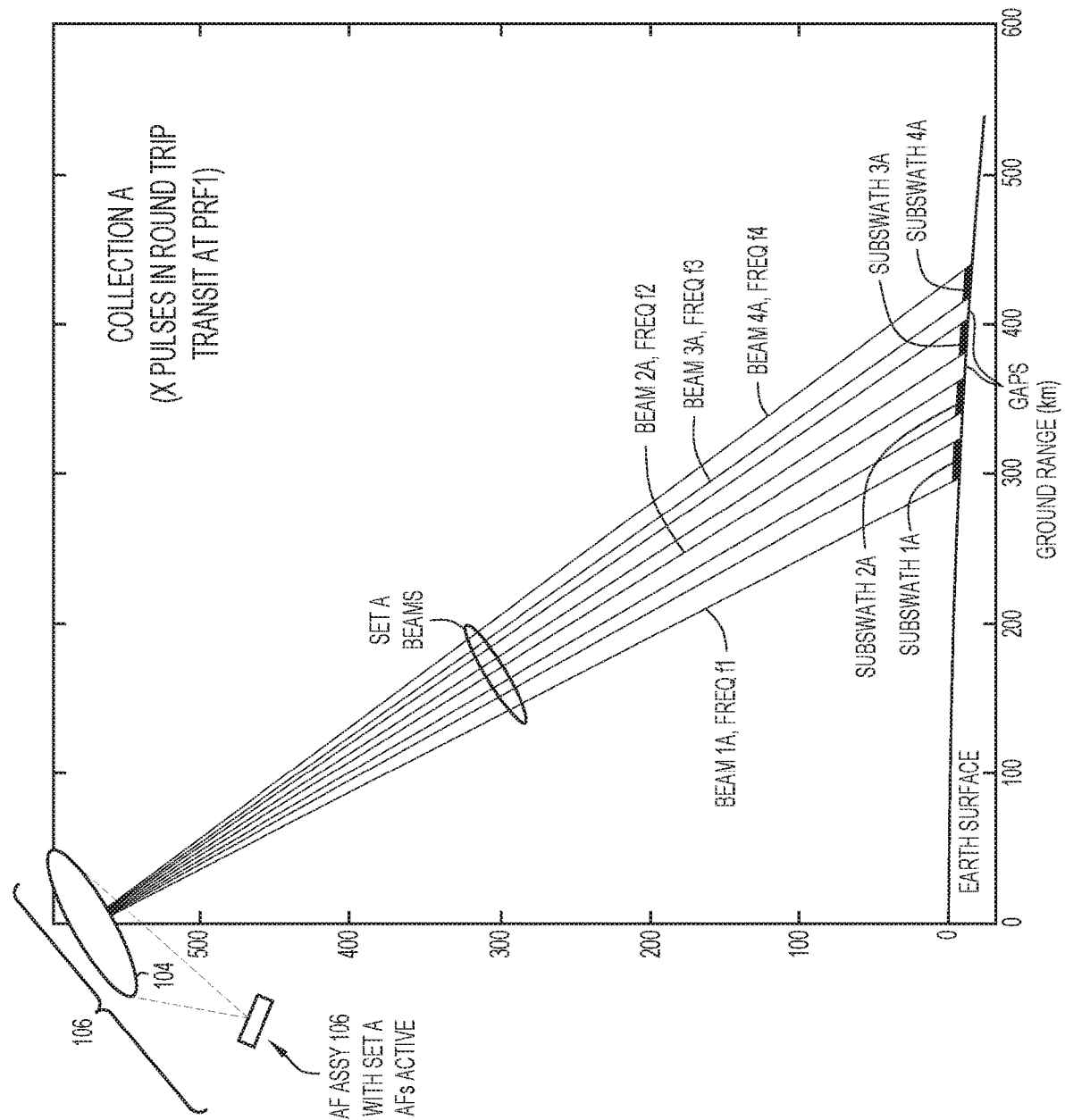
FIG. 3 is an illustration of an example of set A antenna feeds illuminating set A subswaths of the swath via set A antenna beams during the first time period.

Antenna feed assembly 106 includes a set A of separate antenna feeds (AFs) 1A-4A that exchange RF feed energy with reflector 104 in transmit and receive directions to form a set A of concurrent, frequency-separated, respective elevation (radar) beams (BMs) 1A-4A (see, e.g., FIG. 3). The physical separation of each antenna feed 1A-4A causes the set A beams to be directed to different sub-swaths (SSs) 1A-4A within the full radar swath. Each beam operates as both a transmit beam and a receive beam in a time-multiplexed fashion. Beams 1A-4A transmit/receive respective concurrent chirps in frequency-separated channels or bands centered on unique respective frequencies f1-f4. In an example, frequencies f1-f4 may be in C-band (e.g., around 5.4 GHz).

Figure 4:
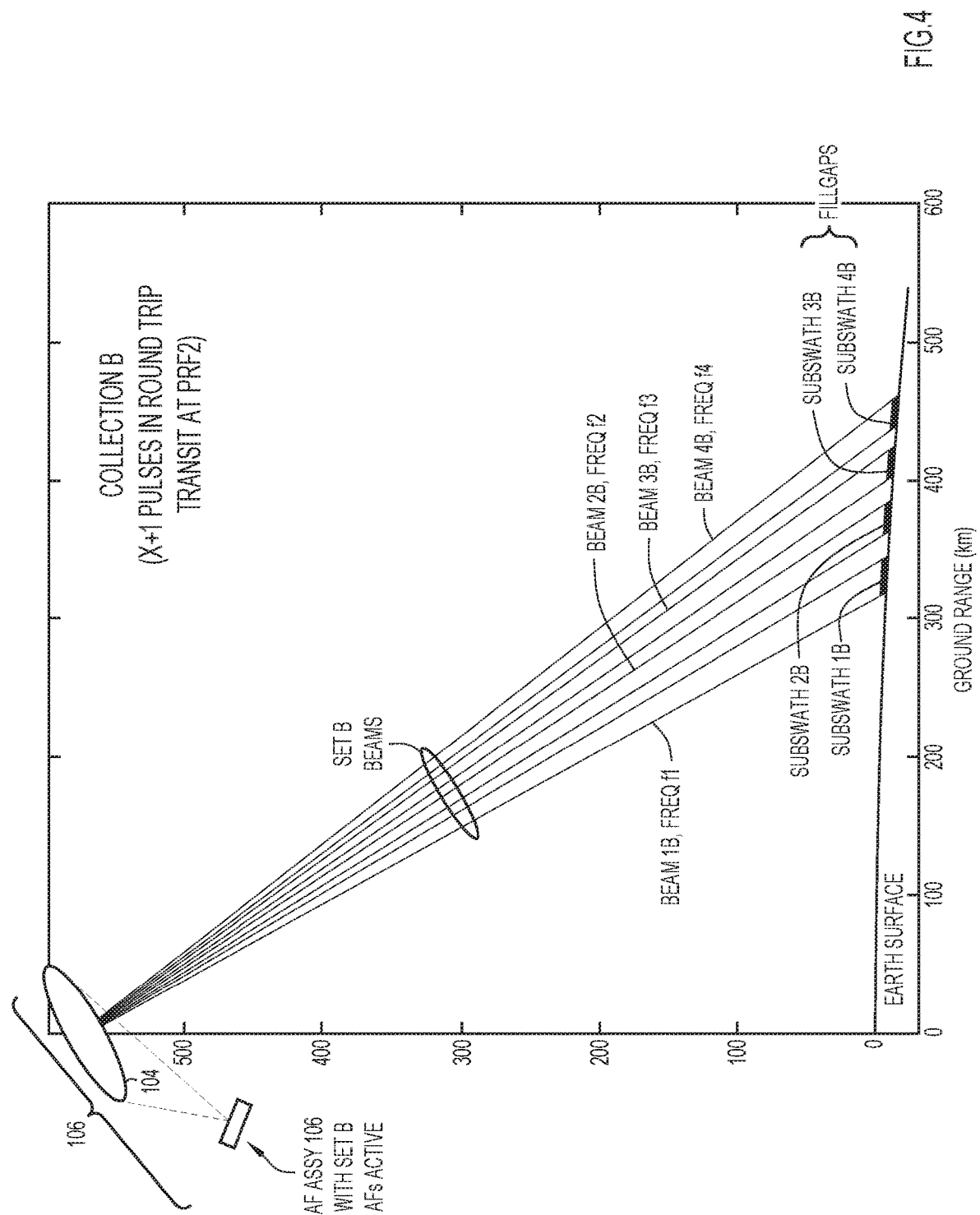
FIG. 4 is an illustration of an example of set B antenna feeds illuminating set B subswaths of the swath via set B antenna beams during the second time period.

Antenna feed assembly 106 also includes a set B of separate antenna feeds 1B-4B that exchange RF feed energy with reflector 104 in the transmit and receive directions to form a set B of concurrent, frequency-separated, respective elevation (radar) beams 1B-4B (not shown in FIG. 1A, but shown in FIG. 4). The physical separation of each antenna feed 1B-4B causes the beams to be directed to different sub-swaths (SSs) 1B-4B that are interleaved in elevation with SSs 1A-4A and slightly offset in cross-range from SSs 1A-4A. Each of the set B beams operates as both a transmit beam and a receive beam in a time-multiplexed fashion. Similar to beams 1A-4A, beams 1B-4B transmit/receive respective concurrent chirps in frequency-separated channels centered on unique respective frequencies f1-f4. In another embodiment, the frequencies used by beams 1A-4A may be different from the frequencies used by beams 1B-4B. The configuration of antenna feeds shown in FIG. 1 represent an example, only, and other configurations are possible. For example, the set A and the set B antenna feeds may each include antenna feeds 1A-NA and antenna feeds 1B-NB, where N may be less than or greater than 4. Also, each antenna feed (e.g., antenna feed 1A) may be any type of antenna feed, including feed horns, patch arrays, cup-dipoles, or an array of several feed horns, as described below.

As mentioned above, antenna feeds 1A-4A are positioned such that their beams 1A-4A illuminate on the Earth set A subswaths (SSs) 1A-4A, respectively. As used herein, the term "illuminate" connotes the transfer of RF energy in both transmit and receive directions. Set A subswaths 1A-4A are physically separated one from the next by respective ones of the cross-range subswath gaps. Similarly, antenna feeds 1B-4B are positioned such that their beams 1B-4B illuminate on the Earth set B subswaths 1B-4B, respectively, physically separated one from the next by respective ones of the subswath gaps. Set B is offset in elevation angle so that the subswaths 1B-4B illuminate the subswath gaps of antenna feeds 1A-4A. Together, set A subswaths 1A-4A and set B subswaths 1B-4B form 8 contiguous subswaths of the swath, which has a total width that is equal to a sum of the widths of all the subswaths. In an example, each subswath has a width of many kilometers.

The MCSS SAR operates or utilizes antenna assembly 102 in a repetitive or cyclical time-multiplexed manner that includes a first time period and a second time period that is time-offset from the first time period. The "first time period/second time period" cycle repeats. The first and second time periods are consecutive in time. During the first time period (e.g., during at least a portion of the first time period), only set A antenna feeds 1A-4A form respective beams 1A-4A to illuminate only subswaths 1A-4A of the swath. To form the beams on transmit (i.e., in the transmit direction), antenna feeds 1A-4A transmit concurrent chirps in their respective frequency channels f1-f4. Antenna feeds 1A-4A transmit the concurrent chirps at a first pulse repetition frequency (PRF) that is common across the antenna feeds. In other words, each antenna feed (e.g., antenna feed 1A, antenna feed 2A, and so on) transmits a respective/individual train of chirps at the PRF and in the respective frequency channel (e.g., at frequencies f1, f2, and so on). The chirps in the respective train of chirps transmitted by each of antenna feeds 1A-4A are time-aligned with, but separated in frequency from, corresponding chirps in the individual trains of chirps transmitted by the other antenna feeds. Thus, the antenna feeds 1A-4A collectively transmit a train of concurrent chirps.

In an embodiment, each individual train of transmitted chirps includes both horizontally polarized (H) and vertically polarized (V) chirps. For example, the chirps may alternate between H chirps and V chirps. Thus, the train of concurrent chirps may include alternating H and V concurrent chirps. Also, during the first period, antenna feeds 1A-4A time-multiplex or alternate between transmit during a transmit period of the concurrent chirps, and receive (i.e., operated in the receive direction) between the transmit periods. In this way, antenna feeds 1A-4A alternately transmit the concurrent chirps, and then receive returns of the concurrent chirps. In an embodiment, the receive channel may be configured to receive both horizontal (H) and vertical (V) chirps in each receive period, therefore allowing the radar to measure all 4 possible combinations or transmit/receive polarizations including H/H, V/V, H/V and V/H from alternating H and V transmit chirps.

During the second time period (e.g., during at least a portion of the second time period), only set B antenna feeds 1B-4B form respective beams 1B-4B that illuminate only subswaths 1B-4B (i.e., the gap subswaths), similar to the way the set A antenna feeds formed beams during the first time period. To do this, antenna feeds 1B-4B transmit concurrent chirps in respective frequency channels f1-f4. Antenna feeds 1B-4B transmit the concurrent chirps at a second PRF that is common across the antenna feeds, but different from the first PRF. The difference between the first PRF and the second PRF is selected to align the timing of a reception window with chirp returns from the desired subswaths B1-B4. Thus, antenna feeds 1B-4B each transmits a respective train of chirps at the second PRF and in the respective frequency channel. The chirps in the individual train of chirps transmitted by each of antenna feeds 1B-4B are time-aligned with corresponding chirps in the trains of chirps transmitted by the other antenna feeds. Thus, antenna feeds 1B-4B collectively transmit concurrent chirps.

In an embodiment, each individual train of chirps in the second time period may include both H and V chirps. For example, the chirps may alternate between H chirps and V chirps. During the second time period, antenna feeds 1B-4B also receive returns of the transmitted concurrent chirps from illuminated subswaths 1B-4B. During the second time period, antenna feeds 1B-4B time-multiplex or alternate between transmit during a transmit period of the concurrent chirps, and receive between the transmit periods. In this way antenna feeds 1B-4B alternately transmit the concurrent chirps, and then receive returns of the concurrent chirps. In an embodiment, the receive channel may be configured to receive both horizontal (H) and vertical (V) in each receive period, therefore allowing the radar to measure all 4 possible combinations or transmit/receive polarizations including H/H, V/V, H/V and V/H from alternating H and V transmit chirps.

Figure 1B:
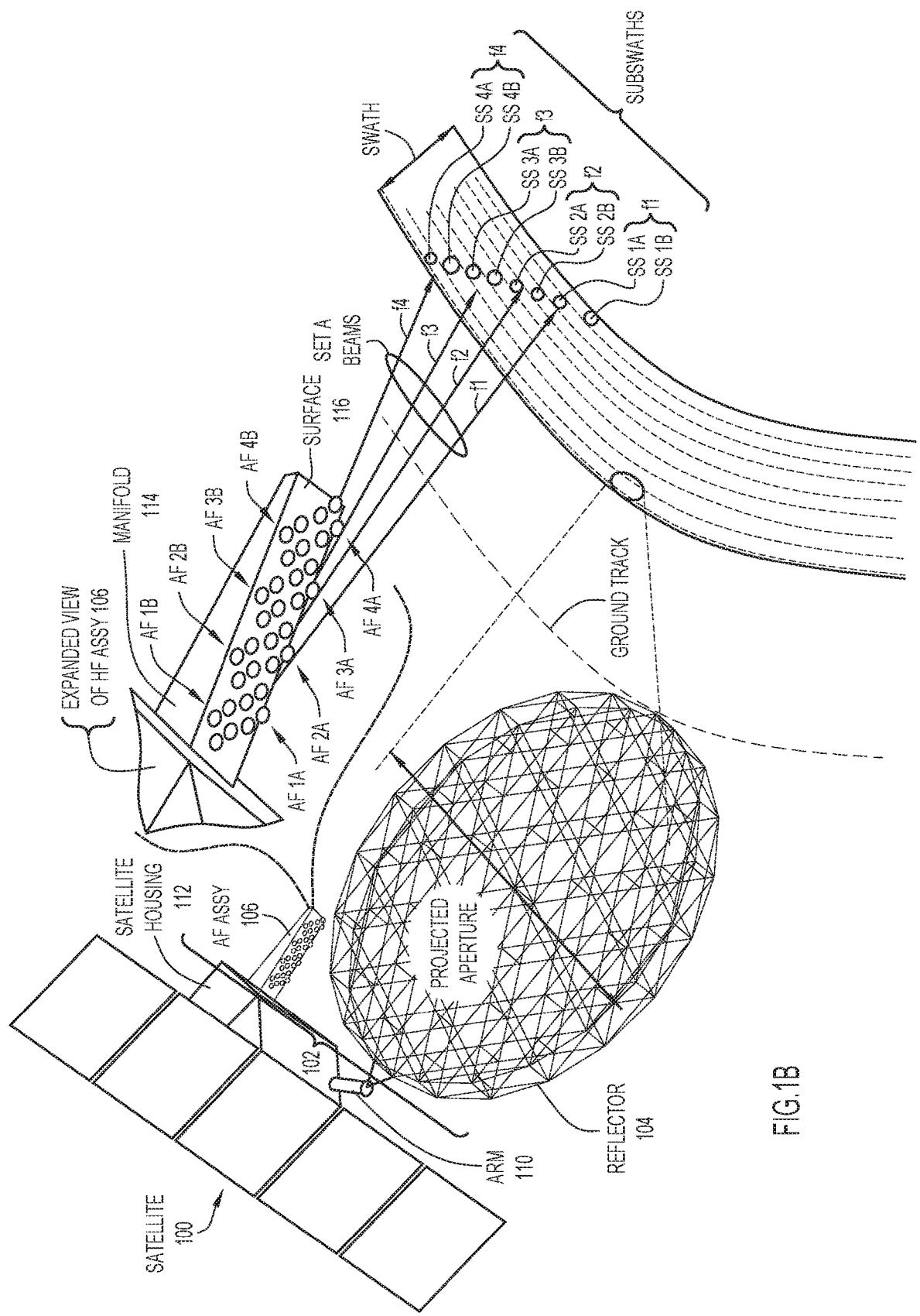
FIG. 1B is an illustration of an example antenna of the MCSS SAR.

With reference to FIG. 1B, there is an illustration of an example of antenna assembly 102, in which antenna feeds 1A-4A and 1B-4B are each implemented as a respective array of individual RF feed elements, as described below. In the example, reflector 104 is suspended from an extension arm 110 that is fixed to, and that extends away from, a housing 112 of the satellite. Also, antenna feed assembly 106 includes a manifold 114 fixed to satellite housing 112 in spaced relation to arm 110, so that the manifold is spaced-apart from reflector 104. Antenna feed assembly 106 includes antenna feeds 1A-4A and 1B-4B fixed to a reflector-facing surface 116 of manifold 114, so that the antenna feeds 1A-4A and 1B-4B are able to exchange RF energy with the reflector. Manifold 114 includes RF cabling and RF components, such as RF combiners/dividers described below in connection with FIG. 1E, to feed RF signals to and from antenna feeds 1A-4A and 1B-4B of antenna assembly 106.

In the example, antenna feeds 1A-4A and 1B-4B each includes a respective array or set of RF feed elements (FEs) (depicted as circles) fixed to manifold 114 and grouped together in a relatively closely spaced arrangement to form the respective array. The groups (of respective RF feed elements) are spaced-apart from each other across surface 116 of manifold 114. Thus, in the example, antenna feeds 1A-4A and 1B-4B represent, and are referred to as, separated, respective arrays 1A-4A and 1B-4B of RF feed elements (the arrays may be referred to as "antenna feed arrays"). Also, set A antenna feeds 1A-4A are referred to as set A arrays 1A-4A, and set B antenna feeds 1B-4B are referred to as set B arrays 1B-4B. The example of FIG. 1B uses 4 RF feed elements (referred to more simply as "feed elements") per array, although more or less feed elements may be used per array. Each feed element may be implemented as an antenna feed horn, a dipole antenna, a patch radiator, a microstrip radiator, and so on. In another example, each array may be replaced with a single shaped feed horn.

As described above in connection with FIG. 1A, the physical separation, and position, of each set A array 1A-4A relative to other ones of the set A arrays causes the set A beams to be directed to different sub-swaths (SSs) 1A-4A within the full radar swath. Each beam operates as both a transmit beam and a receive beam in a time-multiplexed fashion. Similarly, the physical separation, and position, of each array 1B-4B relative to the other set B arrays, and relative to the set A arrays, causes the beams to be directed to different sub-swaths (SSs) 1B-4B that are interleaved in elevation with SSs 1A-4A and slightly offset in cross-range from SSs 1A-4A. Each of the set B beams operates as both a transmit beam and a receive beam in a time-multiplexed fashion. Set A arrays 1A-4A and set B arrays 1B-4B generate set A beams 1A-4A and set B beams 1B-4B as positionally offset, fixed beams, meaning that the beams are not steerable. Thus, motion of satellite 100 causes positional scanning of the fixed beams across subswaths on the Earth. The fixed configuration of arrays 1A-4A and 1B-4B used to generate fixed beams that together trace contiguous sub-swaths of swath enables a greatly simplified and more cost effective antenna design vs. conventional phased arrays required for sweep-SAR or other existing wide swath width approaches.

Figure 1C:
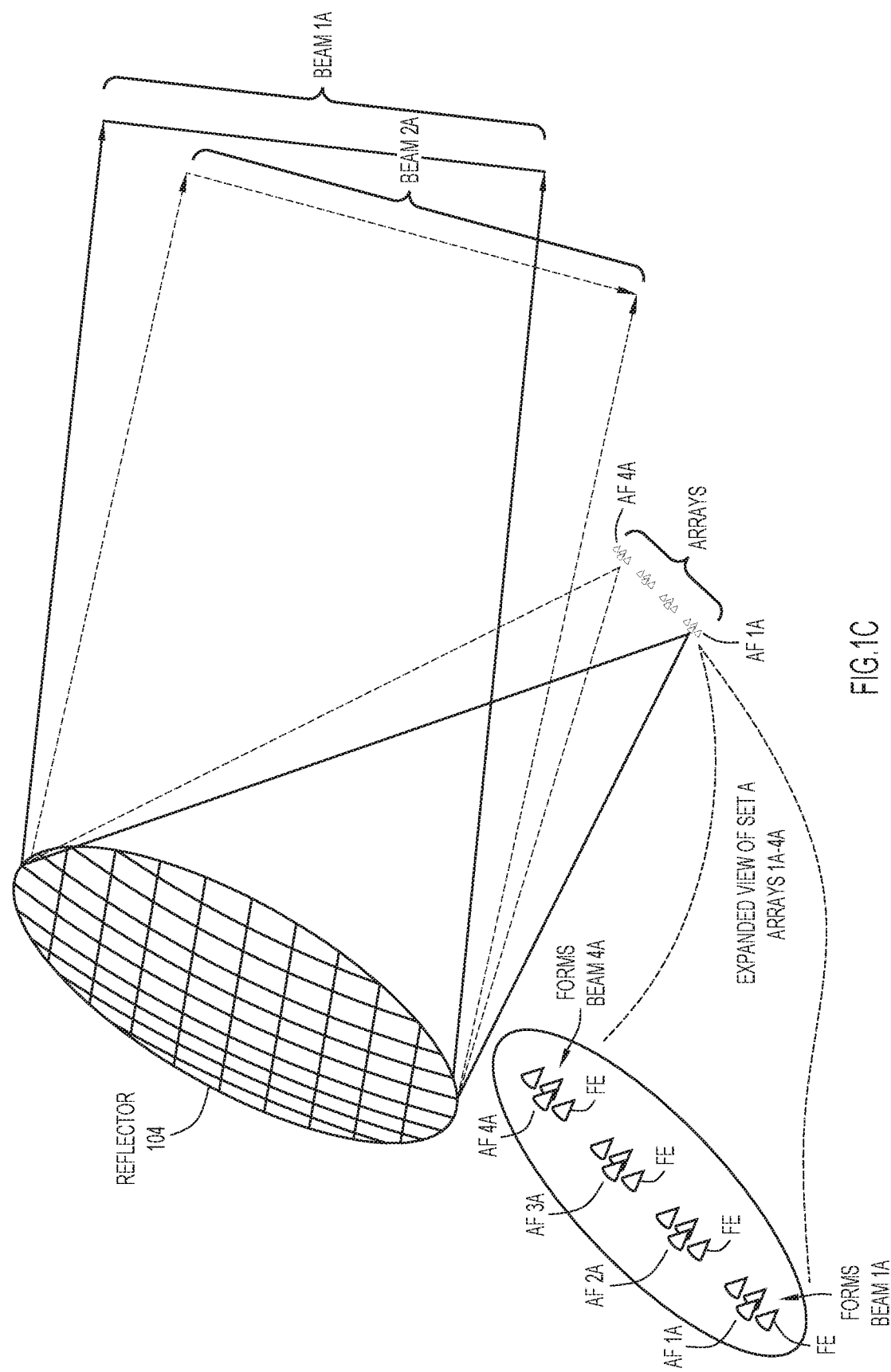
FIG. 1C is an illustration that shows how feed element arrays of the antenna interact with a reflector of the antenna to form fixed beams.

With reference to FIG. 1C, and also with reference to FIG. 1B, there is an illustration that shows how arrays 1A and 4A of set A arrays 1A-4A of feed elements (from FIG. 1B) interact with reflector 104 to form corresponding fixed beams as elliptical beams. Each individual feed element is depicted as an individual cone in FIG. 1C. The respective set of feed elements of each array 1A, 1B, 1C, and 1D exchange RF energy with reflector 104 to form respective ones of fixed elliptical beams 1A, 1B, 1C, and 1D. The physical arrangement/positioning of the 4 feed elements of each array in a pattern in which the feed elements coincide with the 4 vertices of a parallelogram results in a well-formed elliptical beam. As shown in FIG. 1B, set B arrays 1B-4B of feed elements are added to set A arrays 1A-4A of feed elements to give added beams 1B-4B. As is also shown in FIG. 1B, set A arrays 1A-4A are arranged to be spaced-apart from one another along a first straight line or column and set B arrays 1B-4B are arranged to be spaced-apart from one another along a second line or column that is adjacent to and parallel with the first line or column (i.e., the set A arrays and the set B arrays overlap with each other along the first and second straight lines). Alternatively, set A arrays 1A-4A and set B arrays 1B-4B may be arranged end-to-end with respect to each other along a single straight line. The latter arrangement permits sharing of a single antenna element at ends of the arrays. The latter arrangement also eliminates offset along-track, while scanning subswaths.

Figure 1D:
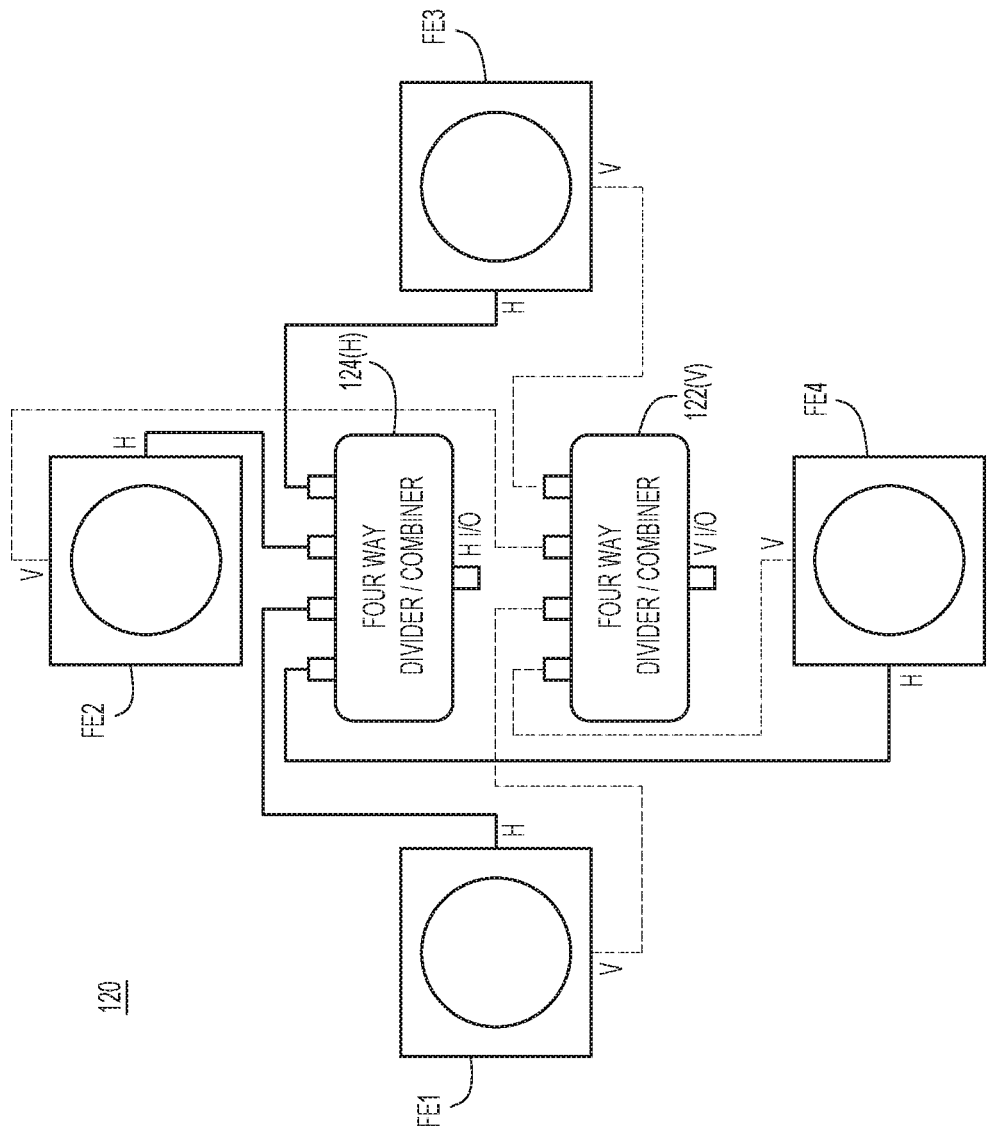
FIG. 1D is a block diagram of an example feed element array configured to generate vertically polarized RF energy and horizontally polarized RF energy.

With reference to FIG. 1D, there is a block diagram of an example array 120 (which represents each of arrays 1A-4A and 1B-4B from FIG. 1B) configured to generate vertically polarized RF energy and horizontally polarized RF energy. Array 120 includes feed elements FE1-FE4, a first (V) divider/combiner 122, and a second (H) divider/combiner 124. Each feed element FEi includes a first (V) input/output (I/O) port and a second (H) I/O port. Each feed element FEi is configured to radiate vertically polarized RF energy to reflector 104 when the V I/O port of the feed element is fed with an RF signal. Conversely, each feed element FEi is configured to radiate horizontally polarized RF energy to reflector 104 when the H I/O port of the feed element is fed with the RF signal. Any known or hereafter developed configuration for feeding an RF signal to different inputs of an array of multiple antenna feeds to selectively cause the array to radiate vertically or horizontally polarized RF energy may be used, as would be appreciated by one of ordinary skill in the relevant arts.

V divider/combiner 122 has a combined (V) I/O port and multiple separate I/O ports. The separate I/O ports are connected to respective ones of the V I/O ports of feed elements FE1-FE4. Similarly, the H divider/combiner 124 has a combined (H) I/O port and multiple separate I/O ports, where the separate I/O ports are connected to respective ones of the H I/O ports of feed elements FE1-FE4. When V divider/combiner 122 receives an RF signal at its combined V I/O port, the V divider/combiner divides the RF signal among the V I/O ports of feed elements FEi, which in turn all radiate vertically polarized RF energy. When H divider/combiner 124 receives an RF signal at its combined H I/O port, the H divider/combiner divides the RF signal among the H I/O ports of feed elements FEi, which in turn all radiate horizontally polarized RF energy. Thus, applying an RF signal to the combined V I/O port of array 120 causes the array to radiate vertically polarized RF energy (to thus form a vertically polarized beam with reflector 104), while applying the RF signal to the combined H I/O port of the array causes the array to radiate horizontally polarized RF energy (to thus form a horizontally polarized beam with reflector 104). Various embodiments described below make use of the above-described dual polarization feature of the array.

While the array of FIG. 1D provides dual polarization, the array may be simplified to provide radiated RF energy with only one type of polarization. In such a configuration, each feed element includes a single I/O port that, when fed with an RF signal, causes the feed element to radiate RF energy that is polarized, be it linearly, circularly, or elliptically polarized (where elliptically polarized is the most general case). The configuration further includes a single divider/combiner to receive the RF signal, and divide the RF signal among the single I/O ports of the feed elements, which all radiate RF energy that is polarized.

Figure 1E:
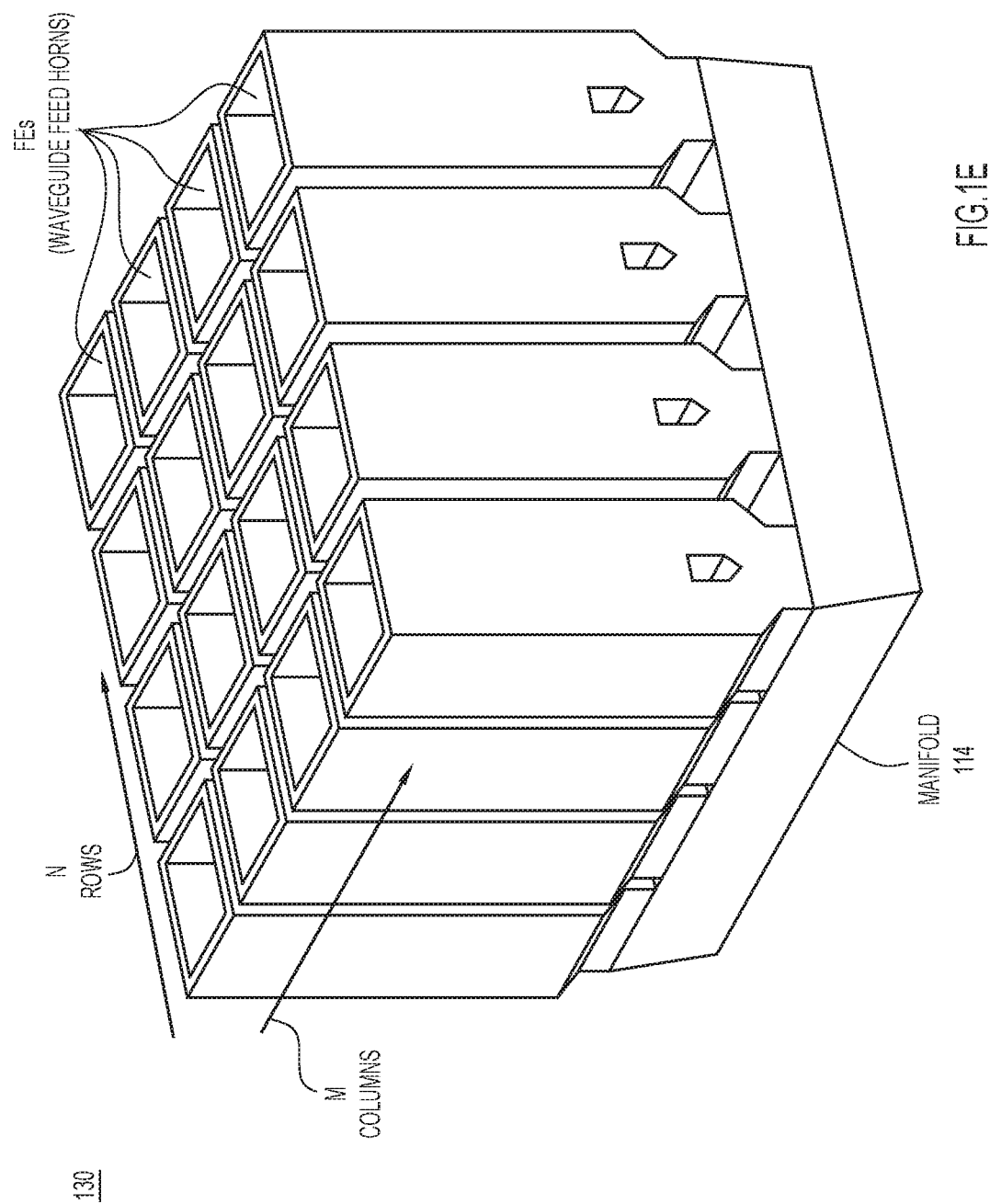
FIG. 1E is a perspective view of an example mechanical configuration of feed elements for multiple feed element arrays.

With reference to FIG. 1E, there is a perspective view of an example mechanical configuration 130 of feed elements (FEs) that collectively form multiple arrays. The feed elements are each implemented as a respective waveguide feed horn, and are clustered tightly together so as to be adjacent each other to form a matrix of the waveguide feed horns having M rows and N columns (i.e., an M×N matrix) of the antenna feed horns, where M represents a total number of the arrays, and N represents a total number of the antenna feed horns in each of the arrays. In the example of FIG. 1E, there are 4 arrays (M=4) and 4 feed horns per array (N=4), but other values of M and N may be used, and M and N may be different from each other. An advantage of the form factor of configuration 130 is that it may be manufactured as a single lightweight package using additive manufacturing techniques, such as three-dimensional printing.

Figures 2A, 2B:
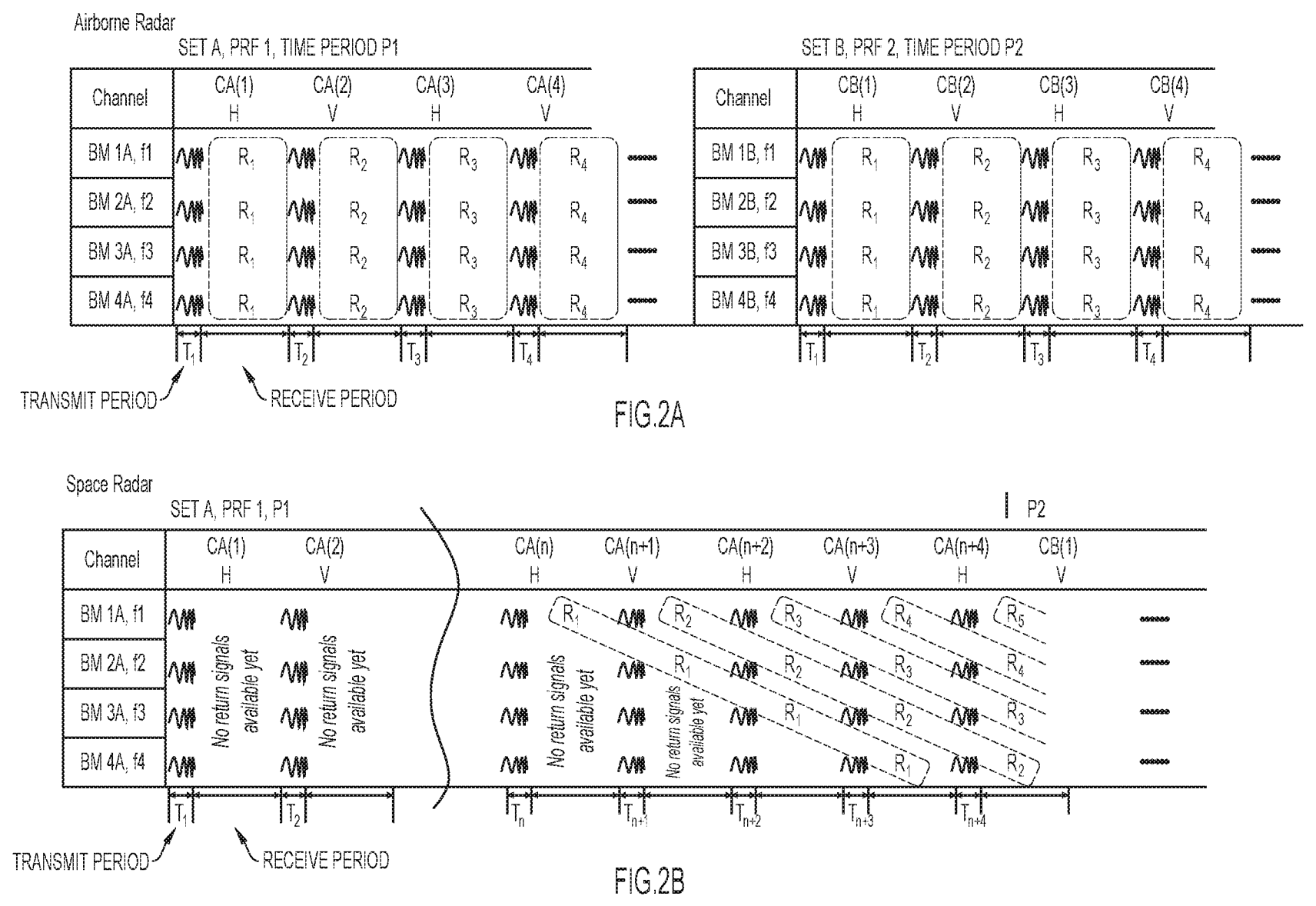

With reference to FIG. 2A, there is a plot of time vs. frequency for an arrangement of chirps transmitted by the set A antenna feeds and the set B antenna feeds during first and second time periods P1 and P2, respectively, for airborne applications. For airborne applications, the travel time of a pulse (e.g., chirp) from the radar to the ground and back is short compared to a pulse repetition interval (PRI) and a given pulse (e.g., chirp) can be received immediately after it is transmitted as shown in FIG. 2A. The transmit and receive windows are consecutive in time and are repeated until the desired along track image area is obtained. The PRI is the time interval between the start of one chirp and the next, which is the inverse of the PRF.

During first time period P1, antenna feeds 1A-4A transmit concurrent sets of chirps CA(1), CA(2), CA(3) and so on, at a first PRF PRF 1 during transmit periods T1, T2, T3, and so on, and receive returns of the chirps during receive periods R1, R2, R3, and so on. Each concurrent set of chirps CA(i) includes time-aligned first, second, third, and fourth chirps in non-overlapping frequency channels centered at frequencies f1, f3, f3, and f4, respectively. In the example of FIG. 2A, the frequency of each chirp increases or ramps-up in frequency over a time period of the chirp. In another example, the frequency of each chirp may decrease over the time period of the chirp. Also, the concurrent chirps may alternate between H concurrent chirps and V concurrent chirps, as shown. In one example, time period P1 is chosen such that data from enough transmit (T) and receive (R) periods is taken to form a SAR image in each of the subswaths SS1, SS2, and so on.

During second time period P2, antenna feeds 1B-4B transmit concurrent sets of chirps CB(1), CB(2), CB(3) and so on, at a second PRF PRF 2 different from PRF 1 during time periods T, and receive returns of the chirps during time periods R. In an example, PRF 1 and PRF 2 are 3250.9 Hz and 3265.7 Hz respectively. Each concurrent set of chirps CB(i) includes time-aligned first, second, third, and fourth chirps in non-overlapping frequency channels centered at frequencies f1, f3, f3, and f4, respectively. The frequency of each chirp increases or ramps-up in frequency over a time period of the chirp. In another example, the frequency of each chirp may decrease over the time period of the chirp, or may be any other similarly frequency limited waveform. Also, the concurrent chirps can alternate between H concurrent chirps and V concurrent chirps, as shown.

With reference to FIG. 2B, the repeating transmit and receive windows are shown as is typical for spaceborne applications. For a space radar, the PRF must be much higher than is required for an airborne radar due to the higher velocity of the measurement platform. Also, because the distance to the ground for a space radar is much greater than for an airborne platform, the PRI for a space radar is much shorter than the travel time of a pulse from the radar to the ground and back. Consecutive transmit and receive time periods are still used; however a given pulse is received a number of PRIs later than when it was transmitted. This is shown in FIG. 2B where the time delay between when a chirp is transmitted and when it is received for the beam 1A is n times the PRI. The other beams are higher in elevation and therefore take longer to return to the space radar at increasing range. The elevation angle of the other beams is chosen such that the chirp returns to the second beam after an interval of n+1 times the PRI and the third beam returns after an interval of n+2 times the PRI, and so forth. The first time period P1 must be extended by n times the PRF to allow all chirps to be received. This design allows all four channels to be sampled simultaneously with a single receiver, but each receive window records the reflected signal from a different transmit period for each respective channel. A process is followed to set up the PRF, delay interval, and elevation angles that is similar to what may be used for a single swath strip-map SAR system, as would be appreciated by one of ordinary skill in the art having access to the present specification.

With reference to FIG. 3, there is an illustration to show the multiple beams and multiple subswaths of the MCSS SAR. More specifically, FIG. 3 shows set A antenna feeds 1A-4A illuminating the set A subswaths 1A-4A on the surface of the Earth that have chirp returns within the time period P1 reception periods via set A beams 1A-4A. FIG. 3 shows subswath gaps between the illuminated (and chirp fully received) subswaths.

With reference to FIG. 4, there is an illustration of set B antenna feeds 1B-4B illuminating the set B subswaths 1B-4B on the surface of the Earth via set B beams 1B-4B during second time period P2. Each of subswaths 1B-4B fills a respective gap between a respective adjacent pair of subswaths among subswaths 1A-4A.

Figure 5:
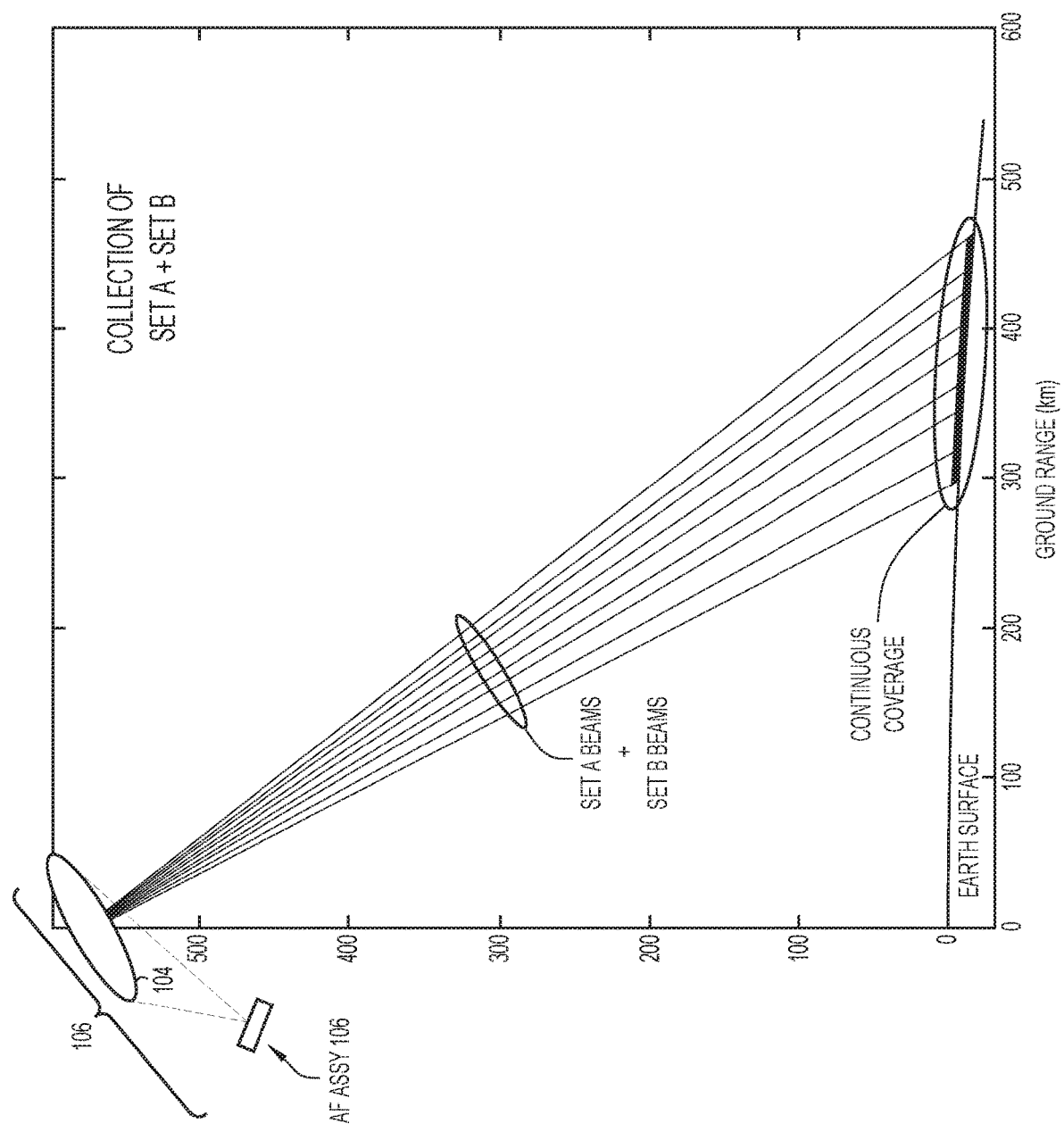
FIG. 5 is an illustration of an example of combined set A and set B antenna feeds illuminating combined set A and set B subswaths of the swath.

With reference to FIG. 5, there is an illustration that superposes both set A antenna feeds 1A-4A illuminating the set A subswaths 1A-4A and set B antenna feeds 1B-4B illuminating the set B subswaths 1B-4B on the surface of the Earth. The illustration shows that the full swath is illuminated when the consecutive time periods P1 and P2 are combined.

With reference to FIG. 6, there is a plot of swath coverage in terms of increasing range for satellite 100 (vertical direction) and satellite track direction/time (horizontal direction). The swath coverage is shown for 3 pairs of repeating time periods P1 and P2, shown in the horizontal direction. The satellite positions during each PRF set is depicted along the bottom. Each simultaneously collected set of 4 subswaths is centered in the along-track direction on the center of the flight path segment flown by the radar platform during the PRF set. The subswaths are over twice as long as the corresponding flight segment to ensure some overlap in the along-track direction with the next set collected at the same PRF. Each set of 4 subswaths labeled 1A-4A corresponds to periods P1, while 1B-4B correspond to periods P2.

Three embodiments of differing complexity of the MCSS SAR discussed above are described below in connection with FIGS. 7A and 7B, although many other embodiments are possible. In the ensuing description, the terminology "coupled to" and "connected to" is broadly construed to cover instances in which components are directly coupled/connected to each other without intervening components, and instances in which components are indirectly coupled/connected to each other through one or more intervening components. Also, switch control signals (also referred to as "switch signals") and timing signals are not shown in FIGS. 7A and 7B; however, certain of the switch signals are shown in FIG. 8. In the example MCSS SARs of FIGS. 7A and 7B, antenna feeds 1A-4A and 1B-4B may be implemented as antenna feed arrays 1A-4A and 1B-4B as described above in connection with FIGS. 1B-1E, e.g., each array may be configured similarly to array 120, described above.

Figure 7A:
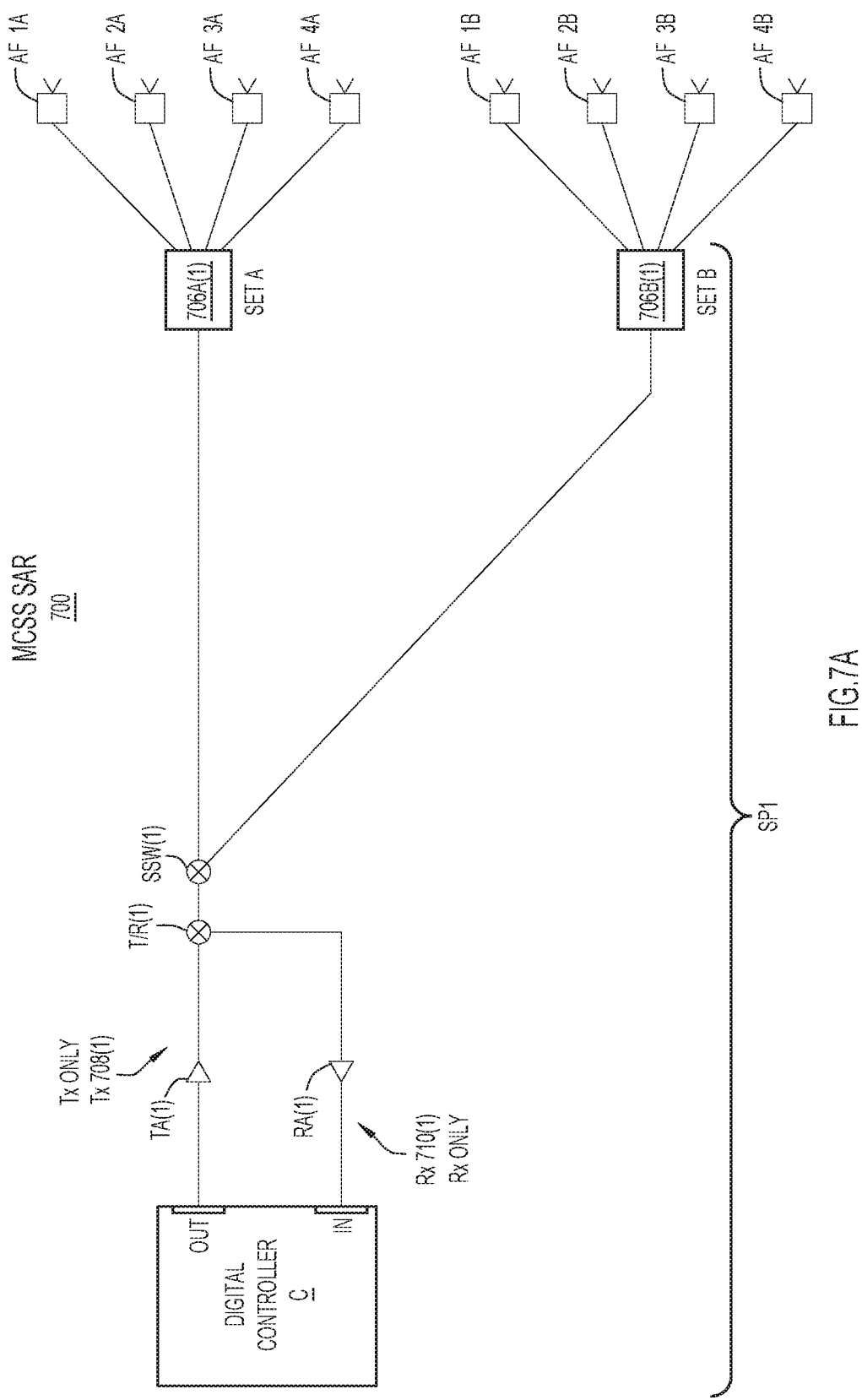
FIG. 7A is a block diagram of the MCSS SAR, according to an embodiment.
Figure 8:
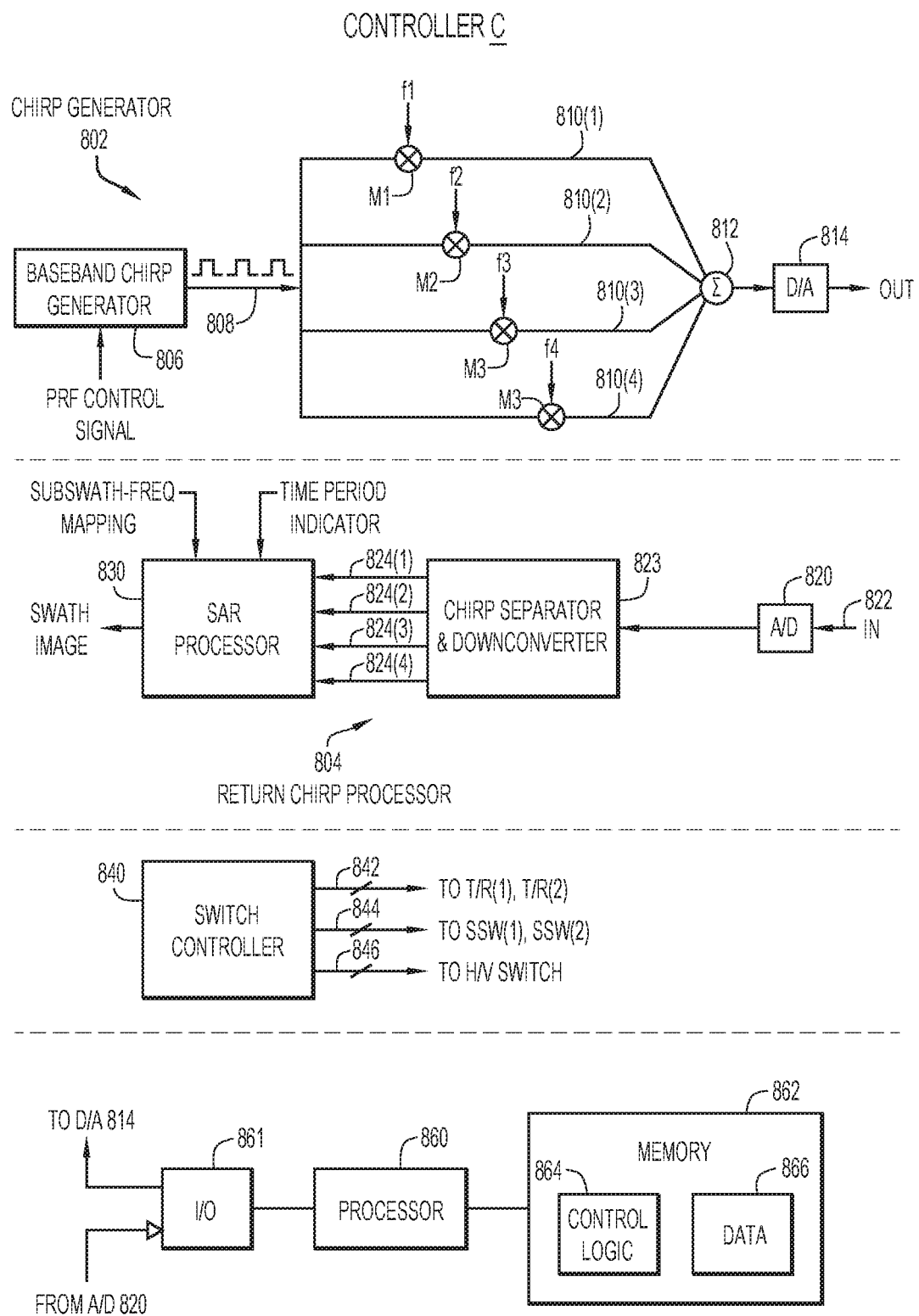
FIG. 8 is an illustration of an example digital controller of the MCSS SAR.

With reference to FIG. 7A, there is a block diagram of an example MCSS SAR 700 corresponding to the MCSS SAR discussed above. SAR 700 includes set A antenna feeds 1A-4A and set B antenna feeds 1B-4B (reflector 104 is not shown in FIG. 7A), and a digital controller C coupled to the set A and the set B antenna feeds through respective RF paths. SAR 700 also includes a frequency multiplexer 706A(1) coupled to each of antenna feeds 1A-4A, and a frequency multiplexer 706B(1) coupled to each of antenna feeds 1B-4B. SAR 700 also includes a transmit-only ("TX only") path 708(1) coupled to output OUT of controller C and T/R switch T/R(1) (the T/R switch is coupled to the controller via the transmit-only path and also to frequency multiplexer 706A(1)), and a receive-only ("RX only") path 710(1) coupled to input IN of the controller and T/R switch T/R(1). T/R switch T/R(1) switches between transmit-only paths 708(1) and receive-only path 710(1), respectively, responsive to respective T/R switch signals (not shown in FIG. 7A). Transmit-only path 708(1) includes a power transmit amplifier TA(1) coupled between output OUT of controller C and T/R switch T/R(1). Receive-only path 710(1) includes a receive amplifier RA(1) coupled between T/R switch T/R(1) and input IN of controller C. Receive amplifier RA(1) may including multiple receive amplifiers and a receive filter connected in series. SAR 700 also includes a subswath switch SSW(1) that selectively couples T/R switch T/R(1) to frequency multiplexer 706A(1) or 706B(1) through the subswath switch, responsive to a subswath switch signal (not shown in FIG. 7A). Controller C, frequency multiplexers 706A(1), 706B(1), transmit-only path 708(1), transmit amplifier TA(1), receive-only path 710(1), receive amplifier RA(1), T/R switch T/R(1), subswath switch SSW(1) collectively represent a signal processing assembly SP1 of MCSS SAR 700 coupled to antenna feeds 1A-4A and 1B-4B of antenna assembly 102 (also referred to simply as antenna 102). The signal processing assembly generates, directs, and processes the concurrent chirp pulses as described herein.

In a transmit direction/mode, in a first time period, controller C generates at output OUT a train of concurrent first chirps having frequencies f1-f4 at a first PRF, as shown in FIGS. 2A and 2B. Transmit only path 708(1) forwards the concurrent first chirps to T/R switch T/R(1), which directs the concurrent first chirps to subswath switch SSW(1) during a pulse/ON period of the concurrent first chirps. Subswath switch SSW(1) directs the concurrent first chirps to frequency multiplexer 706(1) over a single RF path. Frequency multiplexer 706(1) frequency-separates (i.e., frequency demultiplexes) the concurrent first chirps into frequency-separated chirps f1, f2, f3, and f4, and provides each individual frequency-separated chirp to a respective one of the set A antenna feeds 1A-4A over a physically separate RF path (one for each feed). Set A antenna feeds 1A-4A transmit their respective individual frequency-separated chirps, concurrently.

In a receive direction/mode, frequency multiplexer 706A(1) receives from antenna feeds 1A-4A individual/separate returns of the concurrent first chirps across the frequencies f1-f4, combines the returns by frequency (i.e., frequency-multiplexes the returns) into frequency-combined returns of the chirps, and directs the frequency-combined returns to subswath switch SSW(1) over the single RF path. Subswath switch SSW(1) directs the frequency-combined returns to T/R switch T/R(1). Between the pulse/ON periods of the concurrent first chirps, the T/R switch directs the returns of the concurrent first chirps to receive only path 710(1). Receive only path 710(1) directs the frequency-combined returns to input IN of controller C, which processes the returns.

During a second time period following the first time period, controller C outputs from output OUT a train of concurrent second chirps having frequencies f1-f4 at a second PRF that is different from the first PRF, as shown in FIGS. 2A and 2B. The RF flow and operations described above for the transmit direction and the receive direction during the first time period are repeated during the second time period, except that subswath switch SSW(1) directs the concurrent second chirps and their returns to and from frequency multiplexer 706B(1) (and set B antenna feeds 1B-4B) instead of frequency multiplexer 706A(1) (and set A antenna feeds 1A-4A).

Figure 7B:
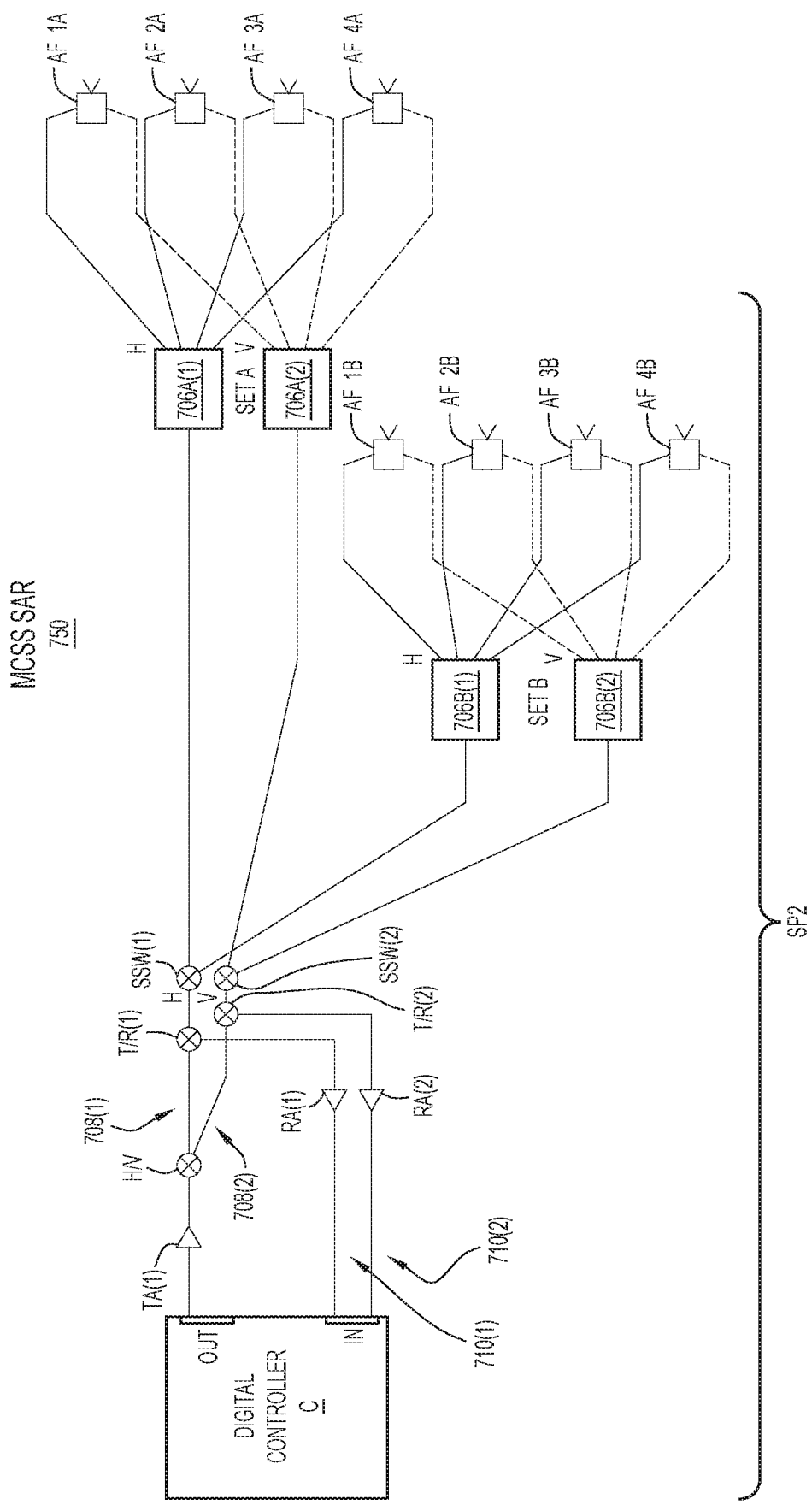
FIG. 7B is a block diagram of the MCSS SAR, according to another embodiment.

With reference to FIG. 7B, there is a block diagram of an example MCSS SAR 750 corresponding to the MCSS SAR discussed above. As will be described, SAR 750 employs dual receive-only paths and dual polarization, e.g., horizontal (H) and vertical (V) polarization. SAR 750 includes additional RF elements and capabilities relative to SAR 700. Specifically, SAR 750 includes an H/V switch "H/V" following transmit power amplifier TA(1) to selectively direct concurrent chirps generated by controller C to either transmit-only path 708(1) or a second transmit-only path 708(2) responsive to an H/V switch signal (not shown in FIG. 7B).

In SAR 750, set A frequency multiplexer 706A(1) is coupled to horizontally polarized I/O ports of set A antenna feeds 1A-4A (e.g., to the combined H I/O port of each H divider/combiner 124 of each of the set A arrays 1A-4A, described above in connection with FIG. 1D), and set B frequency multiplexer 706B(1) is coupled to horizontally polarized I/O ports (i.e., the H ports) of set B antenna feeds 1B-4B (e.g., to the combined H I/O port of each H divider/combiner 124 of each of the set B arrays 1B-4B), such that RF injected to/received from the H ports will be transmitted from/received from the antenna feeds as horizontally polarized RF. SAR 750 also includes a second set A frequency multiplexer 706A(2) coupled to vertically polarized input/output (I/O) ports (i.e., the V ports) of set A antenna feeds 1A-4A (e.g., to the combined V I/O port of V divider/combiner 122 of each of the set A arrays 1A-4A), and a second set B frequency multiplexer 706B(2) coupled to the V ports of set B antenna feeds 1B-4B (e.g., to the combined V I/O port of each V divider/combiner 122 of each of the set B arrays 1B-4B). SAR 750 also includes a second subswath switch SSW(2) to selectively direct concurrent chirps from second transmit-only path 708(2) to either second set A frequency multiplexer 706A(2) or second set B frequency multiplexer 706B(2) responsive to a second subswath switch signal (not shown in FIG. 7B). SAR 750 also includes a second receive-only path 710(2) having a receive amplifier RA(2), and a second T/R switch T/R(2) to selectively direct (i) concurrent chirps from second transmit-only path 708(2) to second subswath switch SSW(2), or (ii) returns of the concurrent chirps from the second subswath switch to second receive-only path 710(2). Controller C, frequency multiplexers 706A(1)/A(2), 706B(1)/B(2), transmit-only paths 708(1), 708(2), transmit amplifier TA(1), the H/V switch, receive-only paths 710(1), 710(2) receive amplifiers RA(1), RA(2), T/R switches T/R(1), T/R(2), and subswath switches SSW(1), SSW(2) collectively represent a signal processing assembly SP2 of MCSS SAR 750 that is coupled to antenna feeds 1A-4A and 1B-4B of antenna assembly 102. The signal processing assembly generates, directs, and processes the concurrent chirp pulses as described herein.

Figure 9:
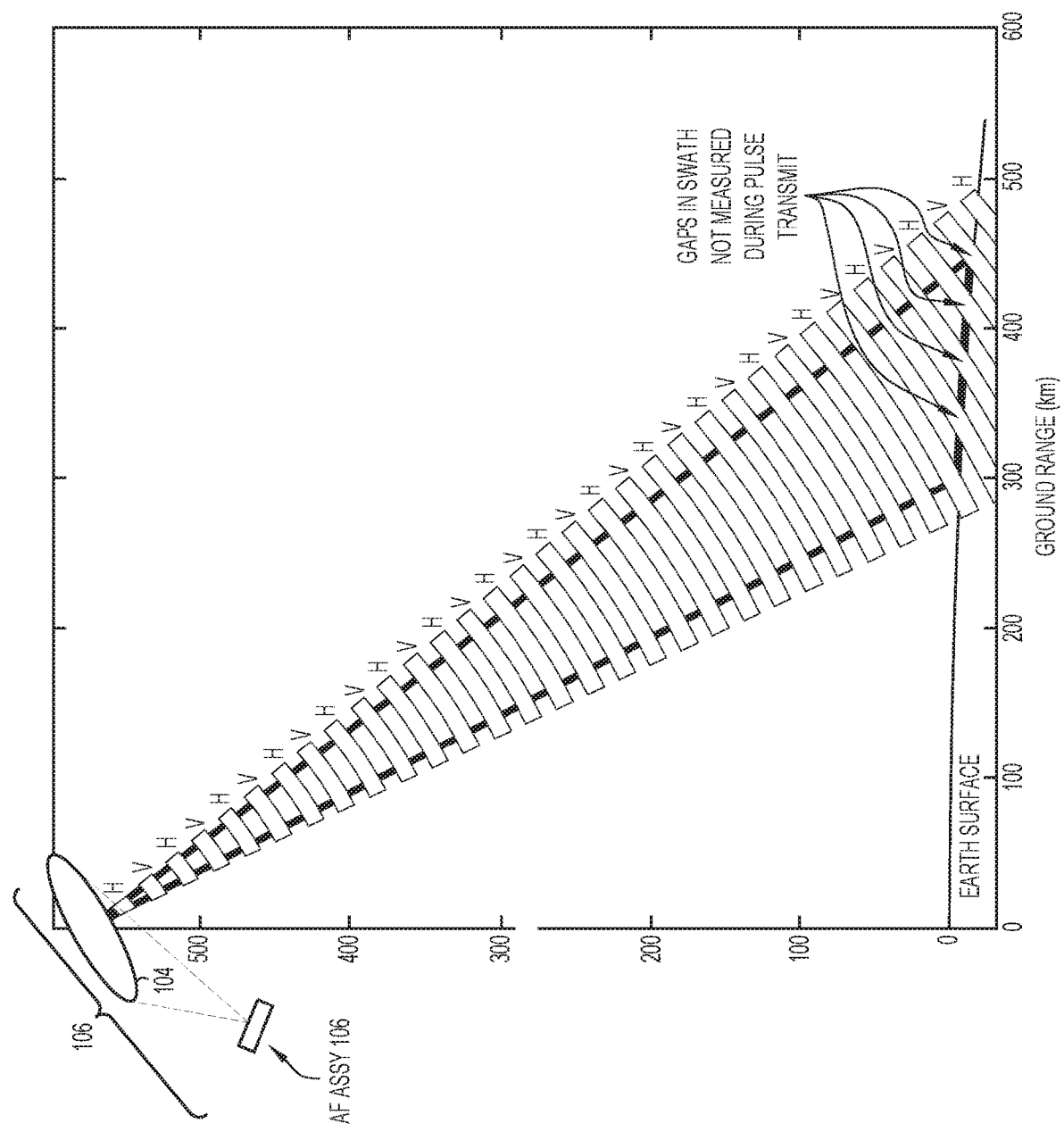
FIG. 9 is an illustration of an example of a given set of antenna feeds of the MCSS SAR transmitting alternating horizontally polarized and vertically polarized concurrent chirps at a given PRF during a given time period to illuminate subswaths.

Operation of SAR 750 is similar to that of SAR 700, except for the following differences. During the first time period, in the transmit direction, switches H/V, T/R(1), T/R(2), SSW(1), and SSW(2) are configured to direct concurrent first chirps in alternating fashion to the H ports of set A antenna feeds 1A-4A frequency multiplexer 706A(1), and then to the V ports of set A antenna feeds 1A-4A through frequency multiplexer 706A(2). As a result, set A antenna feeds 1A-4A transmit alternating H and V concurrent first chirps, as shown in FIGS. 2A, 2B, and 9, for example. In the receive direction, switches T/R(1), T/R(2), SSW(1), and SSW(2) are configured to direct returns of the alternating H and V concurrent first chirps from the H and V ports of set A antenna feeds 1A-4A to receive paths 710(1) and 710(2) through frequency multiplexers 706A(1) and 706A(2), which provide the returns to input IN of controller C for processing.

The RF flow and operations described above for the transmit direction and the receive direction during the first period are repeated during the second time period, except that subswath switches SSW(1) and SSW(2) direct the alternating H and V concurrent second chirps and their returns to and from frequency multiplexers 706B(1) and 706B(2) (and set B antenna feeds 1B-4B) instead of frequency multiplexers 706A(1) and 706A(2) (and set A antenna feeds 1A-4A).

There are numerous other possible embodiments for the MCSS SAR that range in complexity. For example, another embodiment may employ a dual, fully redundant transmit-only path, dual receive-only paths, and dual polarization.

With reference to FIG. 8, there is an illustration of digital controller C, according to an embodiment. Controller C includes a chirp generator 802 and a return chirp processor 804. Chirp generator 802 includes a baseband chirp generator 806 that generates a train of digitized baseband chirps 808 at a PRF indicated by a PRF control signal. Chirp generator 802 includes parallel digital mixers M1-M4 to frequency-upconvert digitized baseband chirps 808 to separate digitized concurrent RF chirps 810(1)-810(4) centered at RF frequencies f1-f4, respectively. Chirp generator 802 also includes a combiner 812 to combine separate digitized concurrent RF chirps 810(1)-810(4) into a combined digitized RF signal including the concurrent chirps (i.e., a frequency-multiplexed signal), and a digital-to-analog converter (D/A) 814 to convert the combined digitized RF signal to an analog RF signal including the concurrent chirps. D/A 814 feeds the analog RF signal to transmit-only paths 708(1), 708(2).

Return chirp processor 804 includes an analog-to-digital converter (A/D) 820 to receive analog RF returns 822 of concurrent chirps from receive-only paths 710(1), 710(2). A/D 820 digitizes the analog RF returns to produce digitized RF returns. Return chirp processor 804 includes a chirp separator and frequency-downconverter 823 to separate the return chirps by frequency, and frequency-downconvert the chirps to baseband, to produce frequency-separated returns chirp signals 824(1)-824(4) corresponding to frequencies f1-f4, respectively, at baseband. Return chirp processor 804 includes a SAR processor 830 that receives mappings between frequencies f1-f4 and subswaths 1A/1B-4A/4B, first and second time period indicators, and frequency-separated chirp signals 824(1)-824(4). SAR processor 830 processes the returns of the concurrent chirps from the 8 subswaths as indicated in chirp signals 824(1)-824(4) in the first and second time periods, to generate a complete SAR image of the swath. Any known or hereafter developed SAR processing technique may be used to form a contiguous SAR image of the swath from returns of concurrent chirps from the subswaths (which may include simultaneous V and H returns of alternating V and H chirps), as would be appreciated by one of ordinary skill in the relevant arts.

Controller C may also include a switch controller 840 to generate two T/R switch signals 842 to control T/R switches T/R(1), T/R(2), two subswath switch signals 844 to control subswath switches SSW(1), SSW(2) (and the time period indicator signal), and an H/V switch signal 846 to control the H/V switch. In another embodiment, switch controller 840 may be separate from controller C.

As described above by way of example, chirp generator 802 and return chirp processor 804 generate and process chirps. It is understood that chirp generator 802 and return chirp processor 804 may also be modified to generate and process pulses other than chirps and that translate to non-chirp radar pulses, for example, pulses that convey carrier waves at a constant frequency, and so on.

Controller C may also include one or more processors 860 to execute software stored in a memory 862. Processors 860 may interface with D/A 814 and A/D 820 through an I/O interface 861. Processor(s) 860 may include, for example, one or more microprocessors and/or microcontrollers. To this end, the memory 862 stores instructions for software stored in the memory that are executed by processor(s) 860 to perform the operations described herein. Memory 862 may comprise read only memory (ROM), random access memory (RAM), magnetic disk storage media devices, optical storage media devices, flash memory devices, electrical, optical, or other physical/tangible memory storage devices. Thus, in general, the memory 862 may comprise one or more tangible (non-transitory) computer readable storage media (e.g., a memory device) encoded with software comprising computer executable instructions and when the software is executed (by the processor(s) 860) it is operable to perform the operations described herein. Memory 862 may store processing logic 864 to implement and/or control baseband chirp generator 802, return chirp processor 804, and switch controller 840. In addition, memory 862 stores data 866 used and generated by the processor(s) 860 when executing the logic described above.

With reference to FIG. 9, there is an illustration of a given set of antenna feeds (e.g., either set A or set B antenna feeds) transmitting alternating H and V concurrent chirps at a given PRF during a time period to illuminate subswaths on the surface of the Earth. During the transmit periods of the alternating H and V concurrent chirps, returns from the surface of the Earth are not received/measured/processed due to the shared receive/transmit paths of SAR 700. This results in the gaps between the subswaths, referred to as ground subswaths with transmit pulse blanking. As mentioned above, transmitting from a second set of HFs alternating H and V concurrent chirps at a different PRF during another time period fills-in the gaps.

Figure 10:
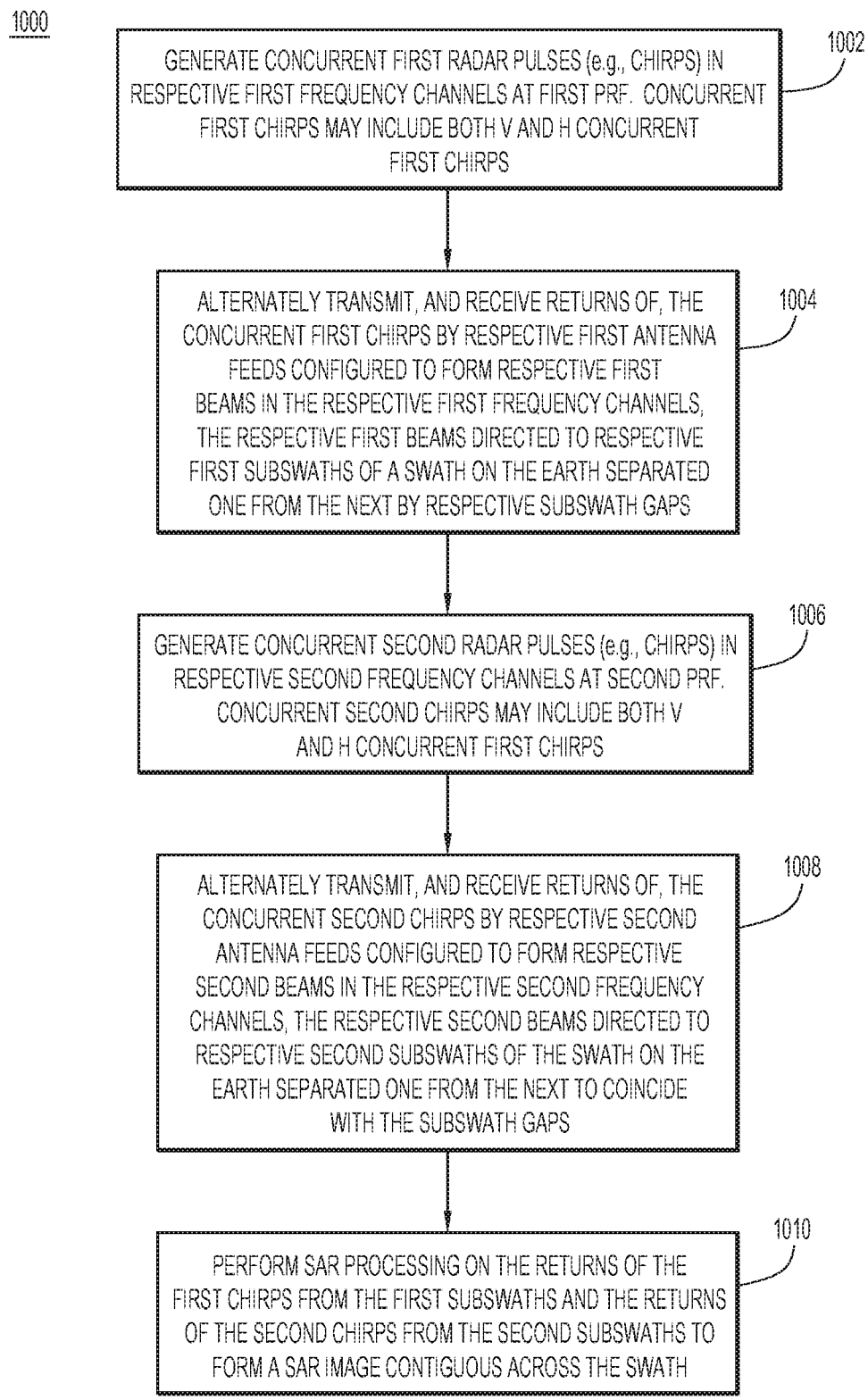
FIG. 10 is a flowchart of an example SAR method performed by the MCSS SAR.

With reference to FIG. 10, there is a flowchart of an example SAR method 1000 performed by any of the MCSS SARs described above, e.g., MCSS SAR 700.

At 1002, the SAR generates concurrent first radar pulses (e.g., chirps) in respective first frequency channels (e.g., the first radar pulses convey respective carrier waves in, i.e., that coincide with, respective first frequency channels) and at a first PRF.

At 1004, the SAR alternately transmits, and receives returns of, the concurrent first radar pulses (e.g., chirps) by respective first antenna feeds configured to form respective first beams in the respective first frequency channels, the respective first beams directed to respective first subswaths of a swath on the Earth separated one from the next by respective subswath gaps.

At 1006, the SAR generates concurrent second radar pulses (e.g., chirps) in respective second frequency channels (e.g., the first radar pulses convey respective carrier waves in/that coincide with respective first frequency channels) and at a second PRF.

At 1008, the SAR alternately transmits, and receives returns of, the concurrent second radar pulses (e.g., chirps) by respective second antenna feeds configured to form respective second beams in the respective second frequency channels, the respective second beams directed to respective second subswaths of the swath on the Earth separated one from the next to coincide with the subswath gaps.

At 1010, the SAR performs SAR processing on the returns of the first radar pulses (e.g., chirps) from the first subswaths and the returns of the second radar pulses (e.g., chirps) from the second subswaths (which may both include returns of V and H radar pulses chirps) to form a SAR image contiguous across the swath.

In summary, in one aspect, an MCSS SAR (e.g., 700, 750) flight vehicle (e.g., 100) that follows a flight path is presented herein. The system comprises a signal processing assembly (e.g., SP1, SP2) to generate first radar pulses and second radar pulses. The system also comprises a radar antenna (e.g., 102) coupled to the signal processing assembly. The radar antenna includes a radio frequency (RF) reflector (e.g., 104) and separated first arrays (e.g., arrays 1A-4A) of RF feed elements (FEs) to form, with the reflector, when the flight vehicle follows the flight path, respective first fixed radar beams (e.g., beams 1A-4A) that are directed at the Earth and positionally offset with respect to each other, such that when the SAR follows the flight path, the respective first fixed radar beams trace respective first subswaths on the Earth that are separated from each other by respective subswath gaps. The system also comprises separated second arrays (e.g., arrays 1B-4B) of RF feed elements to form, with the reflector, when the flight vehicle follows the flight path, respective second fixed radar beams (e.g., beams 1B-4B) that are directed at the Earth and positionally offset with respect to each other, such that when the SAR follows the flight path, the respective second fixed radar beams trace respective second subswaths on the Earth that are separated from each other so as to coincide with, and fill-in, the subswath gaps.

In another aspect, a radar antenna for a flight vehicle that follows a flight path is provided, comprising: a radio frequency (RF) reflector; and separated first arrays of first RF feed elements to form, with the reflector, respective first fixed radar beams that are directed at the Earth and positionally offset with respect to each other, such that when the radar antenna follows the flight path, the respective first fixed radar beams trace respective first subswaths on the Earth that are separated from each other by respective subswath gaps.

In yet another aspect, a synthetic aperture radar (SAR) for/on-board a flight vehicle that follows a flight path is provided, comprising: a signal processing assembly to generate first radar pulses and second radar pulses; and an antenna coupled to the signal processing assembly, the antenna including: a radio frequency (RF) reflector; and separated first arrays of RF feed elements to form, with the reflector, respective first fixed radar beams that are directed at the Earth and positionally offset with respect to each other, such that when the SAR follows the flight path, the respective first fixed radar beams trace respective first subswaths on the Earth that are separated from each other by respective subswath gaps; and separated second arrays of RF feed elements to form, with the reflector, respective second fixed radar beams that are directed at the Earth and positionally offset with respect to each other, such that when the SAR follows the flight path, the respective second fixed radar beams trace respective second subswaths on the Earth that are separated from each other so as to coincide with, and fill-in, the subswath gaps.

In a further aspect, a synthetic aperture radar (SAR) for a flight vehicle, comprises: a controller to generate concurrent first radar pulses in respective first frequency channels, and to generate concurrent second radar pulses in respective second frequency channels; first antenna feeds to transmit, and receive returns of, the concurrent first radar pulses by respective first beams in the respective first frequency channels and that are directed to respective first subswaths of a swath on the Earth separated one from the next by respective subswath gaps; second antenna feeds to transmit, and receive returns of, the concurrent second radar pulses by respective second beams in the respective second frequency channels and that are directed to respective second subswaths of the swath on the Earth separated one from the next to coincide with the subswath gaps; and wherein the controller is configured to perform SAR processing on the returns of the concurrent first radar pulses from the first subswaths and the returns of the concurrent second radar pulses from the second subswaths to form a SAR image contiguous across the swath.

The controller may be configured to: generate the concurrent first radar pulses to include a first train of the concurrent first radar pulses at a first pulse repetition frequency (PRF); and generate the concurrent second radar pulses to include a second train of the concurrent second radar pulses at a second PRF.

The first PRF and the second PRF may be different and configured with respect to each other to ensure the second subswaths coincide with the subswath gaps.

In operation, during a first time period, the first antenna feeds are configured to transmit, and receive returns of, the concurrent first radar pulses; and during a second time period that is offset in time from the first time period, the second antenna feeds are configured to transmit, and receive returns of, the concurrent second radar pulses.

The first train of concurrent first radar pulses may include alternating horizontally polarized (H) and vertically polarized (V) concurrent first radar pulses; the first antenna feeds are configured to transmit, and receive returns of, the alternating H and V concurrent first radar pulses; and the controller is configured to perform SAR processing on the returns of the alternating H and V concurrent first radar pulses, and the returns of the concurrent second radar pulses to form the SAR image.

The second train of concurrent second radar pulses may include alternating H and V concurrent second radar pulses; the first antenna feeds may be configured to transmit, and receive returns of, the alternating H and V concurrent second radar pulses; and the controller is configured to perform SAR on the returns of the alternating H and V concurrent first radar pulses, and the returns of the alternating H and V concurrent second radar pulses.

The first frequency channels may be non-overlapping frequency channels and the second frequency channels may be non-overlapping frequency channels, and the first frequency channels and the second frequency channels may be the same.

Each antenna feed of the first antenna feeds may include a respective antenna feed array of multiple individual horn feeds.

The SAR further comprises a T/R switch coupled to the controller; and a frequency multiplexer coupled to the T/R switch and the first antenna feeds, wherein the T/R switch is configured to direct the concurrent first radar pulses from the controller to the frequency multiplexer during ON periods of the concurrent first radar pulses, and to direct the returns of the concurrent first radar pulses from the frequency multiplexer to the controller between the ON periods.

In a transmit direction, the frequency multiplexer is configured to frequency demultiplex the concurrent first radar pulses into physically separated chirps and to provide the physically separated chirps to respective ones of the first antenna feeds; and in a receive direction, the frequency multiplexer is configured to frequency multiplex the returns of the concurrent first radar pulses received from the first antenna feeds into frequency multiplexed returns, and provide the frequency multiplexed returns to the T/R switch.

In summary, in one aspect, a radar antenna for a flight vehicle that follows a flight path is provided, comprising: a radio frequency (RF) reflector; and separated first arrays of first RF feed elements to form, with the reflector, respective first fixed radar beams that are directed at the Earth and positionally offset with respect to each other, such that when the radar antenna follows the flight path, the respective first fixed radar beams trace respective first subswaths on the Earth that are separated from each other by respective subswath gaps. The radar antenna further comprises: separated second arrays of second RF feed elements to form, with the reflector, respective second fixed radar beams that are directed at the Earth and positionally offset with respect to each other, such that when the radar antenna follows the flight path, the respective second fixed radar beams trace respective second subswaths on the Earth that are separated from each other so as to coincide with, and fill-in, the subswath gaps.

The first arrays may be configured to transmit, and receive returns of, respective first radar pulses in respective first frequency channels by respective ones of the first fixed radar beams; and the second arrays may be configured to transmit, and receive returns of, respective second radar pulses in respective second frequency channels by respective ones of the second fixed radar beams.

The first arrays may be configured to transmit, and receive returns of the respective first radar pulses at a first pulse repetition frequency (PRF), and the second arrays are configured to transmit, and receive returns of, the respective second radar pulses at a second pulse repetition frequency (PRF).

The first PRF and the second PRF may be different and may be configured with respect to each other to ensure the second subswaths coincide with the subswath gaps.

The first frequency channels may be non-overlapping and the second frequency channels may be non-overlapping.

The first frequency channels may be the same as the second frequency channels.

During a first time period, the first arrays may be configured to form, with the reflector, the respective first fixed radar beams that trace the respective first subswaths, and during a second time period that does not overlap with the first time period, the second arrays may be configured to form, with the reflector, the respective second fixed radar beams to trace the respective second subswaths, such that the first subswaths and the second subswaths collectively form a swath of contiguous subswaths.

The first RF feed elements may each include a feed horn, a dipole radiator, or a patch radiator.

Each first RF feed element of each first array may include a first RF input and a second RF input, and may be configured to radiate vertically polarized RF energy and horizontally polarized RF energy when the first RF input and the second RF input are fed with an RF signal, respectively.

In another aspect, a synthetic aperture radar (SAR) for a flight vehicle that follows a flight path is provided, comprising: a signal processing assembly to generate first radar pulses and second radar pulses; and an antenna coupled to the signal processing assembly, the antenna including: a radio frequency (RF) reflector; and separated first arrays of RF feed elements to form, with the reflector, respective first fixed radar beams that are directed at the Earth and positionally offset with respect to each other, such that when the SAR follows the flight path, the respective first fixed radar beams trace respective first subswaths on the Earth that are separated from each other by respective subswath gaps; and separated second arrays of RF feed elements to form, with the reflector, respective second fixed radar beams that are directed at the Earth and positionally offset with respect to each other, such that when the SAR follows the flight path, the respective second fixed radar beams trace respective second subswaths on the Earth that are separated from each other so as to coincide with, and fill-in, the subswath gaps.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A radar antenna for a flight vehicle configured to follow a flight path, comprising:
    a radio frequency (RF) reflector;
    separated first arrays of first RF feed elements;
    separated second arrays of second RF feed elements;
    a transmit/receive (T/R) switch and a subswath switch to selectively couple the T/R switch to the separated first arrays and the separated second arrays; and
    a controller, coupled to the T/R switch, configured to generate first pulses and second pulses, and to control the subswath switch in order to selectively couple the T/R switch to:
        the separated first arrays which form, with the RF reflector, non-steerable first fixed radar beams to transmit, and receive returns of, the first pulses, wherein the first fixed radar beams are directed at the Earth and positionally offset with respect to each other so as to trace respective first subswaths on the Earth that are separated from each other by subswath gaps; and
        the separated second arrays, which form, with the RF reflector, non-steerable second fixed radar beams to transmit, and receive returns of, the second pulses, wherein the second fixed radar beams are directed at the Earth and positionally offset with respect to each other to trace second subswaths on the Earth to fill-in the subswath gaps.

2. The radar antenna of claim 1, wherein the controller includes:
a chirp generator to generate the first pulses as a train of concurrent frequency-separated first pulses, and to generate the second pulses as a train of concurrent frequency-separated second pulses; and
a switch controller to generate a T/R switch signal to control the T/R switch, and to generate a subswath switch signal to control the subswath switch to selectively couple the T/R switch to the separated first arrays or the separated second arrays.

3. The radar antenna of claim 1, wherein:
the first arrays are configured to transmit, and receive returns of, respective ones of the first pulses in respective first frequency channels by respective ones of the first fixed radar beams; and
the second arrays are configured to transmit, and receive returns of, respective ones of the second pulses in respective second frequency channels by respective ones of the second fixed radar beams.

4. The radar antenna of claim 3, wherein:
the first arrays are configured to transmit the first pulses at a first pulse repetition frequency (PRF); and
the second arrays are configured to transmit the second pulses at a second pulse repetition frequency (PRF).

5. The radar antenna of claim 4, wherein the first PRF and the second PRF are different and configured with respect to each other to ensure the second subswaths coincide with the subswath gaps.

6. The radar antenna of claim 3, wherein:
the first frequency channels are non-overlapping and the second frequency channels are non-overlapping.

7. The radar antenna of claim 3, wherein:
the first frequency channels are the same as the second frequency channels.

8. The radar antenna of claim 1, wherein:
during a first time period, the first arrays are configured to form, with the RF reflector, the first fixed radar beams that trace the first subswaths; and
during a second time period that does not overlap with the first time period, the second arrays are configured to form, with the RF reflector, the second fixed radar beams to trace the second subswaths, such that the first subswaths and the second subswaths collectively form a swath of contiguous subswaths.

9. The radar antenna of claim 1, wherein the first RF feed elements each includes a feed horn, a dipole radiator, or a patch radiator.

10. The radar antenna of claim 1, wherein:
each first RF feed element of each first array includes a first RF input and a second RF input, and is configured to radiate vertically polarized RF energy and horizontally polarized RF energy when the first RF input and the second RF input are fed with an RF signal, respectively.

11. The radar antenna of claim 10, wherein each first array further includes:
a first divider/combiner to receive an RF signal and divide the RF signal among the first RF inputs of the first RF feed elements of the first array to cause the first array to radiate vertically polarized RF energy; and
a second divider/combiner to receive an RF signal and divide the RF signal among the second RF inputs of the first RF feed elements of the first array to cause the first array to radiate horizontally polarized RF energy.

12. The radar antenna of claim 10, wherein:
each first array is configured to form, with the reflector, the first fixed radar beam as (i) a vertically polarized radar beam when all of the first inputs of the first RF feed elements of the first array are fed with the RF signal, and (ii) a horizontally polarized radar antenna beam when all of the second inputs of the first RF feed elements of the first array are fed with the RF signal.

13. The radar antenna of claim 1, further comprising:
a first frequency multiplexer coupled between the subswath switch and the first RF feed elements; and
a second frequency multiplexer coupled between the subswath switch and the second RF feed elements.

14. The radar antenna of claim 1, wherein the first RF feed elements of each first array form a respective group of first RF feed elements that is positionally offset from other respective groups of the first RF feed elements, and is positioned with respect to the reflector such that the first RF feed elements of the respective group feed RF energy to and receive RF energy from the reflector in transmit and receive directions, respectively.

15. The radar antenna of claim 1, wherein each of the first RF feed elements of the first arrays includes a respective feed horn, and the feed horns of the first arrays are arranged as a matrix of the feed horns having M rows and N columns, where M represents a total number of the first arrays, and N represents a total number of the feed horns in each of the first arrays.

* * * * *